(12) United States Patent
Takemoto et al.

(10) Patent No.: US 6,503,358 B1
(45) Date of Patent: Jan. 7, 2003

(54) METHOD FOR ASSEMBLING PARTS

(75) Inventors: Hiroshi Takemoto, Tokyo (JP);
Shinobu Kanatani, Kanagawa (JP);
Yoshihiro Morii, Kanagawa (JP);
Shigeru Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 09/635,259

(22) Filed: Aug. 9, 2000

Related U.S. Application Data

(62) Division of application No. 09/237,661, filed on Jan. 27, 1999, now Pat. No. 6,224,709.

(30) Foreign Application Priority Data

| Jan. 27, 1998 | (JP) | 10-029351 |
| Feb. 9, 1998 | (JP) | 10-044705 |
| Feb. 10, 1998 | (JP) | 10-044570 |
| Feb. 12, 1998 | (JP) | 10-049044 |

(51) Int. Cl.$^7$ .............................. B29C 65/00
(52) U.S. Cl. ..................... 156/295; 156/304.3
(58) Field of Search ............... 156/295, 304.3, 156/556; 248/205.4, 475.1; 403/402, 403, 231; 52/657; 269/319

(56) References Cited

U.S. PATENT DOCUMENTS

| 3,400,847 A | * 9/1968 | Stute ............................. 217/69 |
| 5,426,573 A | * 6/1995 | Jenkins ........................... 27/1 |
| 6,000,784 A | 12/1999 | Takemoto et al. |

FOREIGN PATENT DOCUMENTS

JP 10-309801 * 11/1998

OTHER PUBLICATIONS

U.S. patent application Ser. No. 09/635,259, filed Aug. 9, 2000, pending.
U.S. patent application Ser. No. 09/834,973, filed Apr. 16, 2001, pending.
U.S. patent application Ser. No. 09/756,785, filed Jan. 10, 2001, pending.
U.S. patent application Ser. No. 09/756,786, filed Jan. 10, 2001, pending.
U.S. patent application Ser. No. 09/777,847, filed Feb. 7, 2001, pending.
U.S. patent application Ser. No. 09/400,202, filed Sep. 14, 1999, pending.
U.S. patent application Ser. No. 09/236,575, filed Jan. 26, 1999, pending.
U.S. patent application Ser. No. 09/605,053, filed Jun. 28, 2000, pending.

* cited by examiner

Primary Examiner—Jeff H. Aftergut
Assistant Examiner—John T. Haran
(74) Attorney, Agent, or Firm—Oblon, Spivak, McClelland, Maier & Neustadt, P.C.

(57) ABSTRACT

A method and an apparatus for fixing a part and a part support for mounting the part by use of adhesive via an intermediate member are disclosed. The adhesive is implemented by photocuring adhesive while the intermediate member is formed of a material transparent for light. The intermediate member is free from coloring and deformation when illuminated by light for curing the adhesive. The adhesive is prevented from dropping or turning round to other portions during assembly.

6 Claims, 24 Drawing Sheets

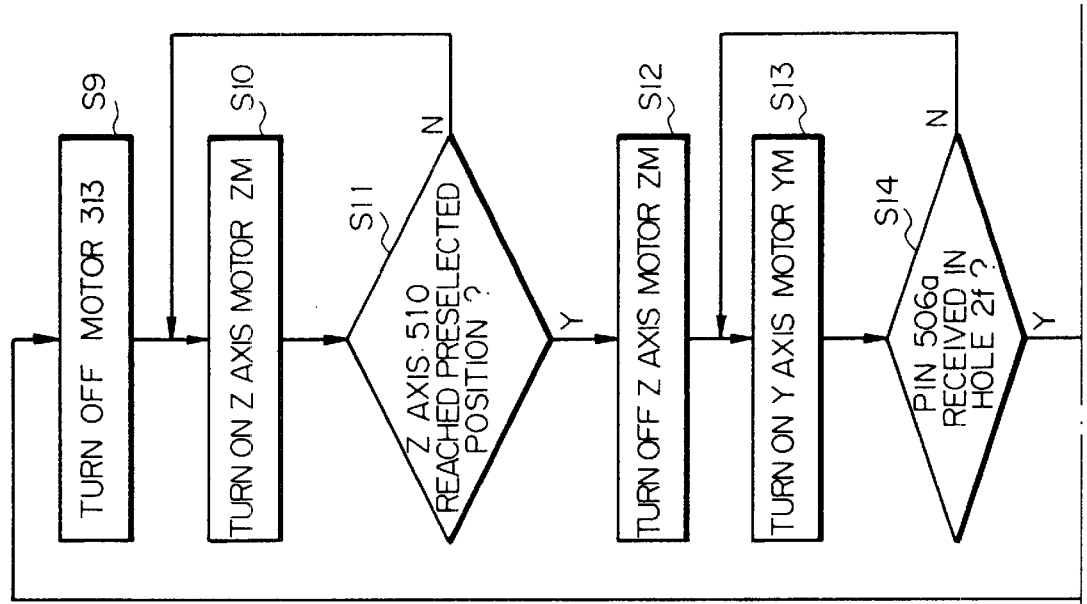
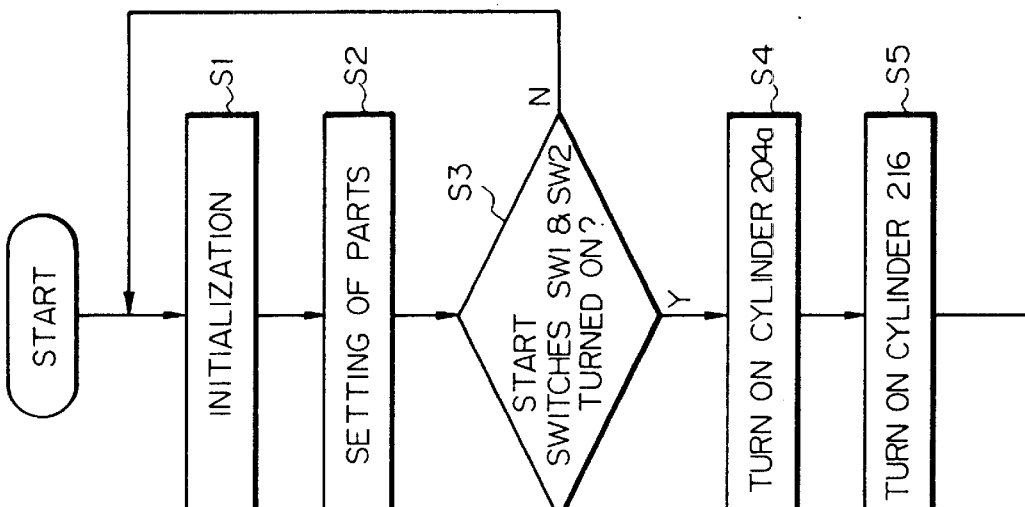
Fig. 5A
Fig. 5
| Fig. 5A |
| Fig. 5B |

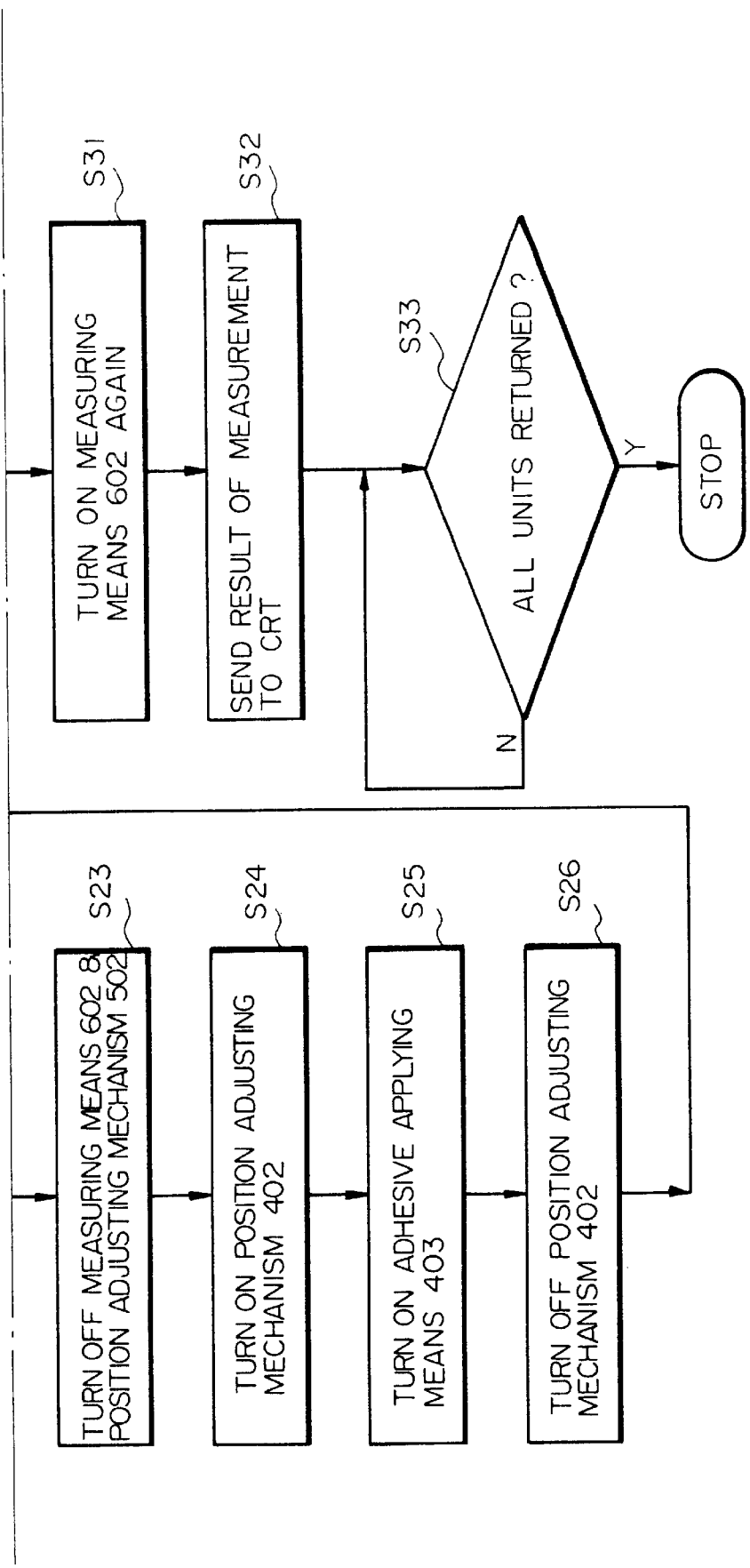

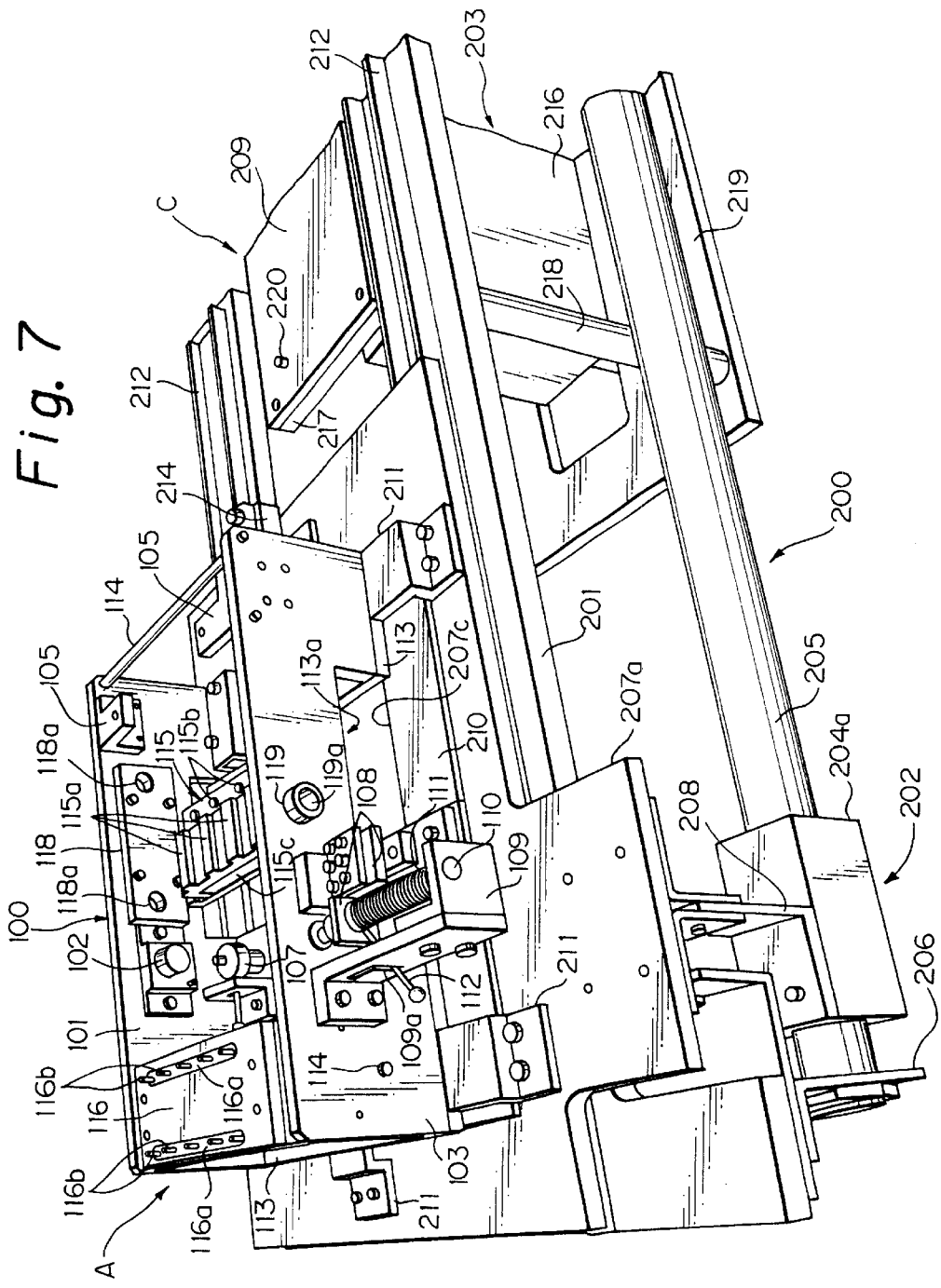

METHOD FOR ASSEMBLING PARTS

CROSS REFERENCE TO RELATED APPLICATION

The present document is a division and claims the benefit of the earlier filing date of U.S. patent application Ser. No. 09/237,661, entitled "METHOD AND APPARATUS FOR ASSEMBLING PARTS" filed in the U.S. Patent and Trademark Office on Jan. 27, 1999, now U.S. Pat. No. 6,224,709 the entire contents of which being incorporated herein by reference.

BACKGROUND OF THE INVENTION

The present invent ion relates to a method and an apparatus for assembling parts and more particularly to a method and an apparatus for fixing with adhesive a part and a part support for mounting the part via an intermediate member or members provided between the part and the part support.

Generally, to fix a part and a part support via a bracket-like intermediate member positioned between the part and the part support, it has been customary to fasten the part and part support and the intermediate member by using screws. Screws, however, are apt to displace the part relative to the part support due to a torque when they are driven, and thereby make it difficult to accurately position the part.

In light of the above, the part and part support and the intermediate member may be so configured as to mate with each other in a preselected positional relation. Although this approach enhances the positional accuracy of the individual structural element, it causes the positional accuracy of the resulting assembly to be unconditionally determined by the finishing accuracy of the individual element. It is therefore necessary to machine the individual structural element with high accuracy. While this kind of approach reduces the assembling cost, it increases the material and machining costs of the individual structural element. This is particularly true when the parts are plastic moldings apt to scatter in accuracy due to sinking and other causes.

To assemble the part and part support via the intermediate member without being effected by the finishing accuracy of the individual element while maintaining them in an accurate positional accuracy, it is desirable to connect the part, part support and intermediate member by using adhesive. This, however, brings about a problem that whether or not the part and part support are dislocated at the time of adhesion determines the positioning accuracy of the part relative to the part support after adhesion. It follows that the positional relation between the part and the part support at the time of adhesion has critical influence on the quality of the resulting product.

For example, assume that the above part is a print head included in a printer, a line sensor included in a scanner, or a solid imaging device included in a CCD (Charge Coupled Device) camera. Then, when any positional error occurs between the part and the part support, it displaces an image printed or read by the part and thereby deteriorates image quality.

Particularly, when the part is an ink jet head included in an ink jet printer, it occurs that the distance between the head surface of the head formed with nozzle holes and a recording medium is scattered or that the nozzle holes fail to accurately face a position where an image should be printed on the recording medium. As a result, ink drops ejected from the nozzle holes reach the recording medium outside of a preselected printing position, noticeably lowering the image quality. In the case of a color printer including heads respectively loaded with ink of different colors (usually yellow ink, magenta ink, cyan ink and black ink), any positional error between the heads makes the print positions of ink drops of different colors irregular. This brings the different colors forming a color image out of register or causes the color image to distort.

The prerequisite with the adhesive scheme is therefore that the part and the part support be accurately held, beforehand, in a preselected positional which will allow the part and part support to accurately face an assembly position at the time of adhesion. In this connection, in the case of the head of a color printer, the allowable error of the head adhered to the part support should be confined in the range of the order of microns.

As for the adhesive scheme, the positional relation between the part and the part support at the time of adhesion is a critical factor that determines the accuracy of mounting of the part to the part support, as stated earlier.

In light of the above, there has been proposed a part assembling apparatus of the type positioning the part support at a preselected position and holding it there, while holding the part in a position variable relative to the part support. By varying the position of tho part, the apparatus adjusts a position in which the part should be mounted to the part support. An intermediate member is so positioned as to contact the part and part support. The apparatus applies photocuring adhesive to the interface between the part and the intermediate member and the interface between the intermediate member and the part support and the intermediate member for thereby fixing them together. This type of apparatus, however, has the following problems left unsolved.

If light for curing the adhesive applied to the interfaces is not uniformly distributed, a part of the adhesive is rapidly cured while the other part is slowly cured. As a result, the thickness of the adhesive layer differs from the part cured rapidly to the part cured slowly. Presumably, this is because the area of each interface over which the adhesive applied sequentially increases with the elapse of time due to, e.g., the surface tension of the adhesive. The irregular thickness f the adhesive effects the positional relation between the structural elements and thereby degrades the assembling accuracy of the structural elements.

The above problem will be solved if the light is uniformly radiated onto the adhesive. This, however, cannot be easily done because the gap available at the interface between the structural elements where the adhesive is applied is extremely small.

The intermediate member may be formed of resin transparent for light, as also proposed in the past. In this case, light is radiated onto the interfaces of the intermediate member via the intermediate members, so that the adhesive existing at the interfaces is cured at a substantially uniform rate. However, experiments showed that the light directly illuminating the adhesive via the intermediate member caused the composition of the transparent intermediate member to change and caused the member to color in muddy yellow little by little. The coloring of the intermediate member was particularly conspicuous when use was made of UV (Ultra Violet) rays as the light and UV curable adhesive as the adhesive.

Further, because the UV transmission of such colored intermediate member decreased, the UV rays could not fully cure the adhesive unless radiated for more then the expected period of time via the intermediate member, compared to the case of direct radiation. The decrease in the curing efficiency of the adhesive and therefore the extended radiation of the UV rays heated the intermediate member to such a degree that the member deformed.

In another conventional part assembling procedure, an intermediate member is positioned between the part and the part support. Adhesive is applied to a substantially vertical first interface and a substantially horizontal second interface between the part and part support and the intermediate member, thereby connecting the part and part support via the intermediate member. In this case, the adhesive is not always applied to each interface to a preselected thickness over a preselected area although it may be fed in a preselected amount. Specifically, adhesive used to mount the part usually has relatively high viscosity so as not to drop and is apt to protrude in the form of yolk when applied to the surface of the part due to the surface tension of the adhesive.

Assume that the structural members are assembled by the adhesive protruding from the surfaces of the members, as stated above. Then, it is likely that the area of the adhesive on each structural member is smaller than the expected adhering surface and causes the members to come off due to short adhesion strength. In addition, when the thickness of the adhesive differs from the first interface to the second interface, the structural members are displaced from each other when assembled. Moreover, the protuberance of the adhesive just after application is not constant, rendering the stress inside of the adhesive irregular during curing. Therefore, should the structural members be assembled without any processing following the application of the adhesive, the part would be inclined relative to the part support. In addition, it needs a long period of time for the adhesive protruding from the adhering surfaces to be cured, resulting in low productivity.

Furthermore, the liquid-like adhesive applied to the first interface is apt to drop due to its own weight or to turn round to the second interface. When the adhesive drops or turns round to any other position, the amount of the adhesive applied to the first interface and that of the adhesive applied to the second interface differ from the initial amount. As a result, the adhesive layers formed on the two interfaces are different in thickness from each other.

In the above condition, the positional relations between the part and the intermediate member and between the part support and the intermediate member are quite likely to differ from the time of position adjustment to the time of completion of the assembly. Errors in this kind of positional relations cannot be corrected by the position adjustment beforehand because the drop or the turn-round of the adhesive or an increase or a decrease in the amount of the adhesive ascribable thereto cannot be estimated. By contrast, errors ascribable to the contraction of the adhesive due to curing can be corrected by the position adjustment beforehand because the positional deviation of the individual member is proportional to the amount and area of application of the adhesive.

SUMMARY OF THE INVENTION

It is therefore an object of the present invention to provide a method and an apparatus for assembling parts capable of preventing an intermediate number intervening between a part and a part support and formed of resin transparent for light from coloring or deforming when illuminated by light for curing photocuring adhesive.

It is another object of the present invention to provide a method and an apparatus for assembling parts capable of obviating short adhesion strength and displacement during the adhesion of a part, a part support and an intermediate member and enhancing productivity at the time of assembly.

It is a further object of the present invention to provide a method and an apparatus for assembling parts capable of preventing adhesive from dropping or turning round to other portions during the adhesion of a part, a part support, and an intermediate member.

In accordance with the present invention, a method of fixing a part and a part support for mounting the part by use of photocuring adhesive via an intermediate member formed of resin transparent for light includes the steps of radiating light for curing the adhesive, and cutting a part of the light lying in a wavelength range causing the property of the intermediate member to change.

Also, in accordance with the present invention, an apparatus for fixing a part and a part support for mounting the part via an intermediate member formed of resin transparent for light and contacting the part and part support includes an applying device for applying photocuring adhesive to interfaces between the part, part support and intermediate member, a radiating device for radiating light to the interfaces via the intermediate member, and a bandpass filter positioned on an optical path for the light for cutting a part of the light lying in a wavelength range causing the property of the intermediate member to change.

Further, in accordance with the present invention, a method of fixing a part and a part support for mounting the part via an intermediate member by using adhesive includes the steps of positioning the intermediate member between the part and the part support, applying adhesive to a substantially vertical first interface and a substantially horizontal second interface between the part and the part support and the intermediate member, causing a pressing device to press the intermediate member against the part and the part support, and causing the adhesive applied to the first interface and second interface to spread.

Moreover, in accordance with the present invention, an apparatus for fixing a part end a part support for mounting said part by using adhesive with the intermediary of an intermediate member provided between the part and the part support includes a part support holding portion for positioning and holding the part support at a preselected assembling position. A part supporting portion supports the part in a position adjustable relative to the part support held by the part support holding portion. A position detecting device detects the position of the part supported by the part supporting portion. A position adjusting device adjusts, based on the position detected by the position detecting device, a position in which the part should be mounted to the part support held by the part support holding device. An adhesive applying device applies the adhesive to a substantially vertical first interface and a substantially horizontal second interface between the part and the intermediate member and between the part support and said intermediate member. A pressing device presses the intermediate member against the part and part support to thereby cause the adhesive applied to the first interface and second interface to spread.

In addition, a method of fixing a part and a part support for mounting the part via an intermediate member by using adhesive includes the steps of positioning the intermediate member between the part and the part support, applying adhesive to a substantially vertical first interface and a substantially horizontal second interface between the part and the intermediate member and between the part support and said intermediate member, and half-curing, before a relative position of the part and the part support is adjusted, the adhesive applied to the first interface to a degree preventing the adhesive from dropping due to its own weight.

BRIEF DESCRIPTION OF THE DRAWINGS

The above and other objects, features and advantages of the present invention will become more apparent from the following detailed description taken with the accompanying drawings in which.

Figure 3:
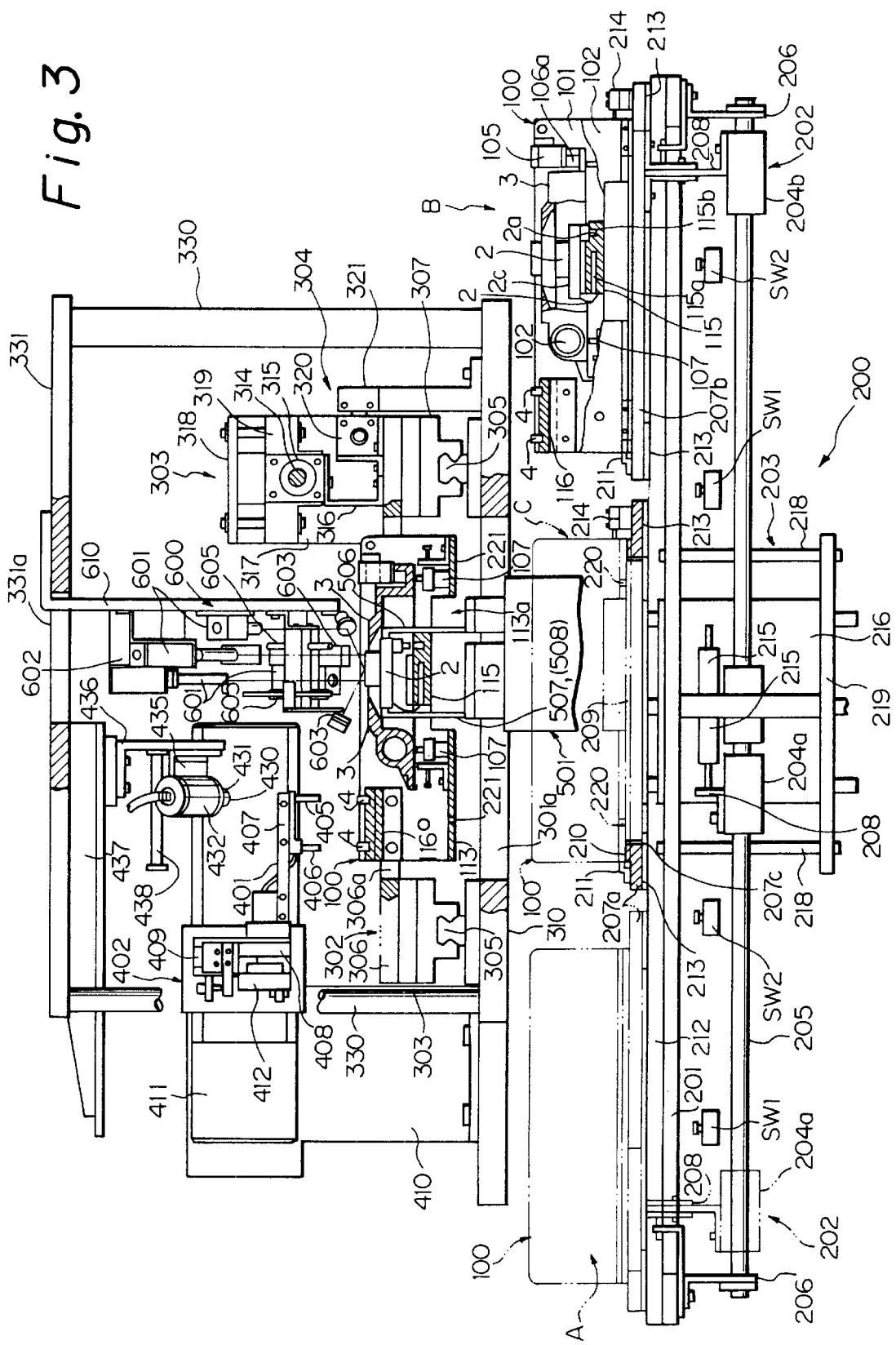
Figure 4:
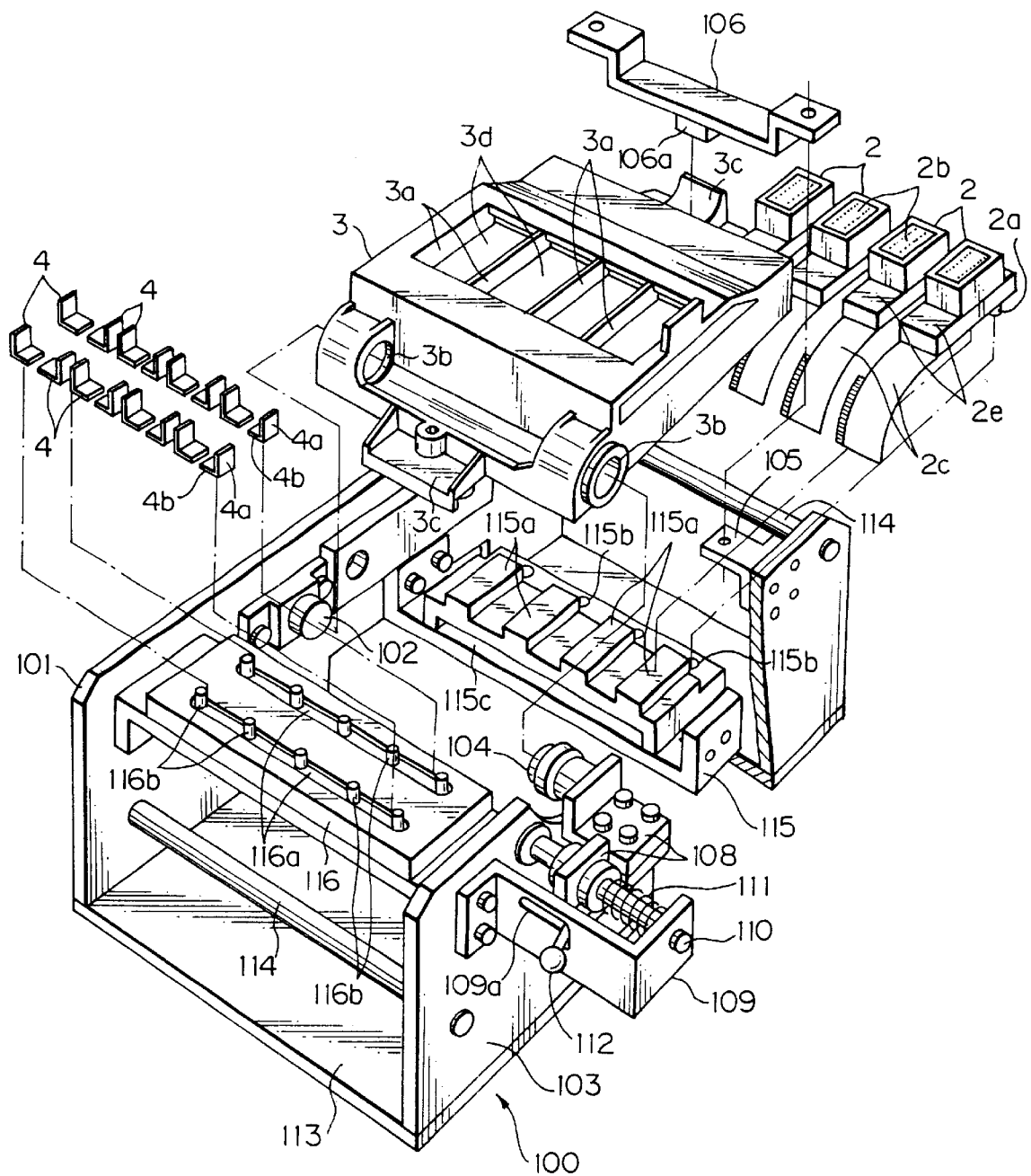
Figure 5B:
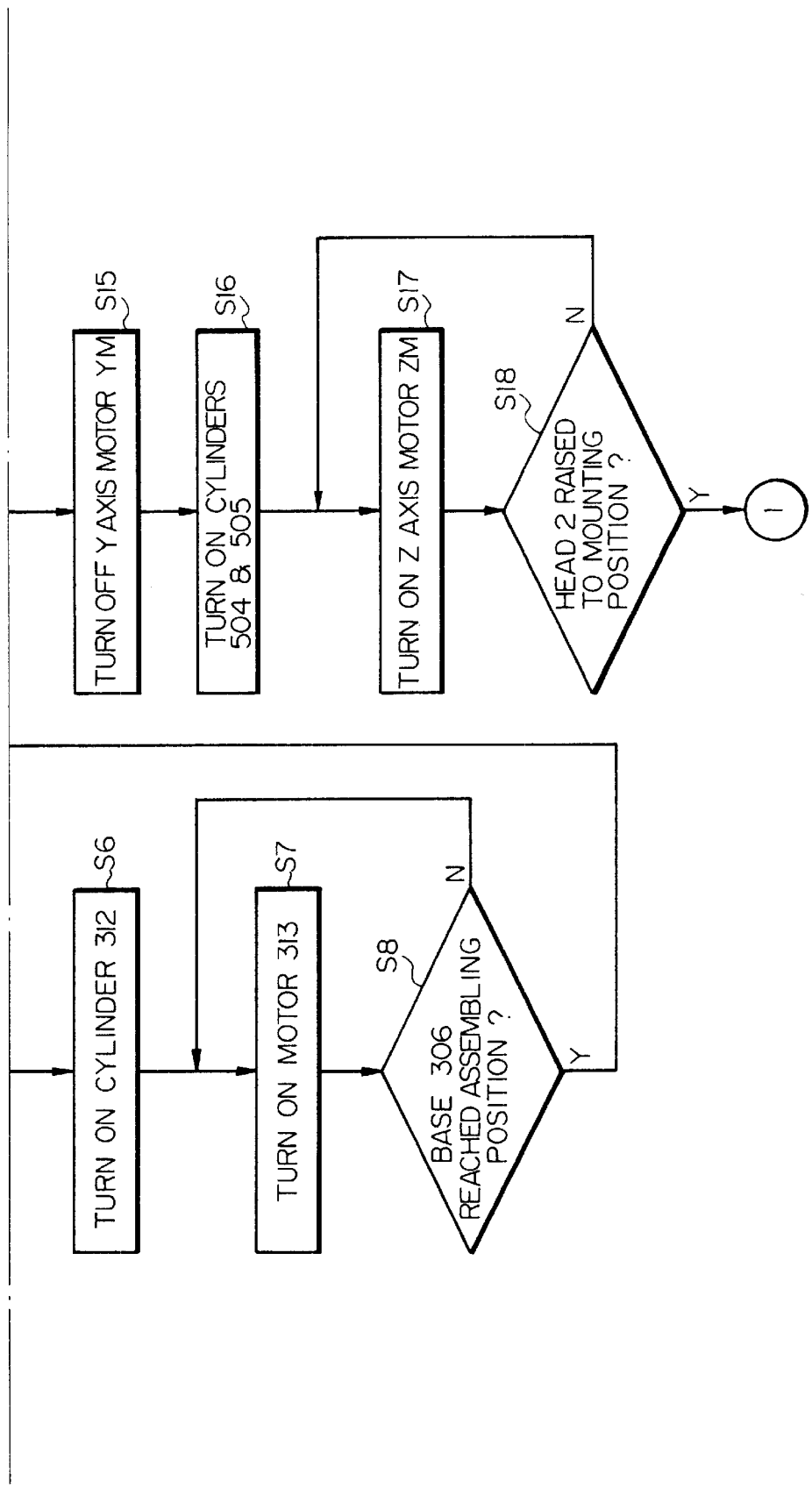
Figure 6A:
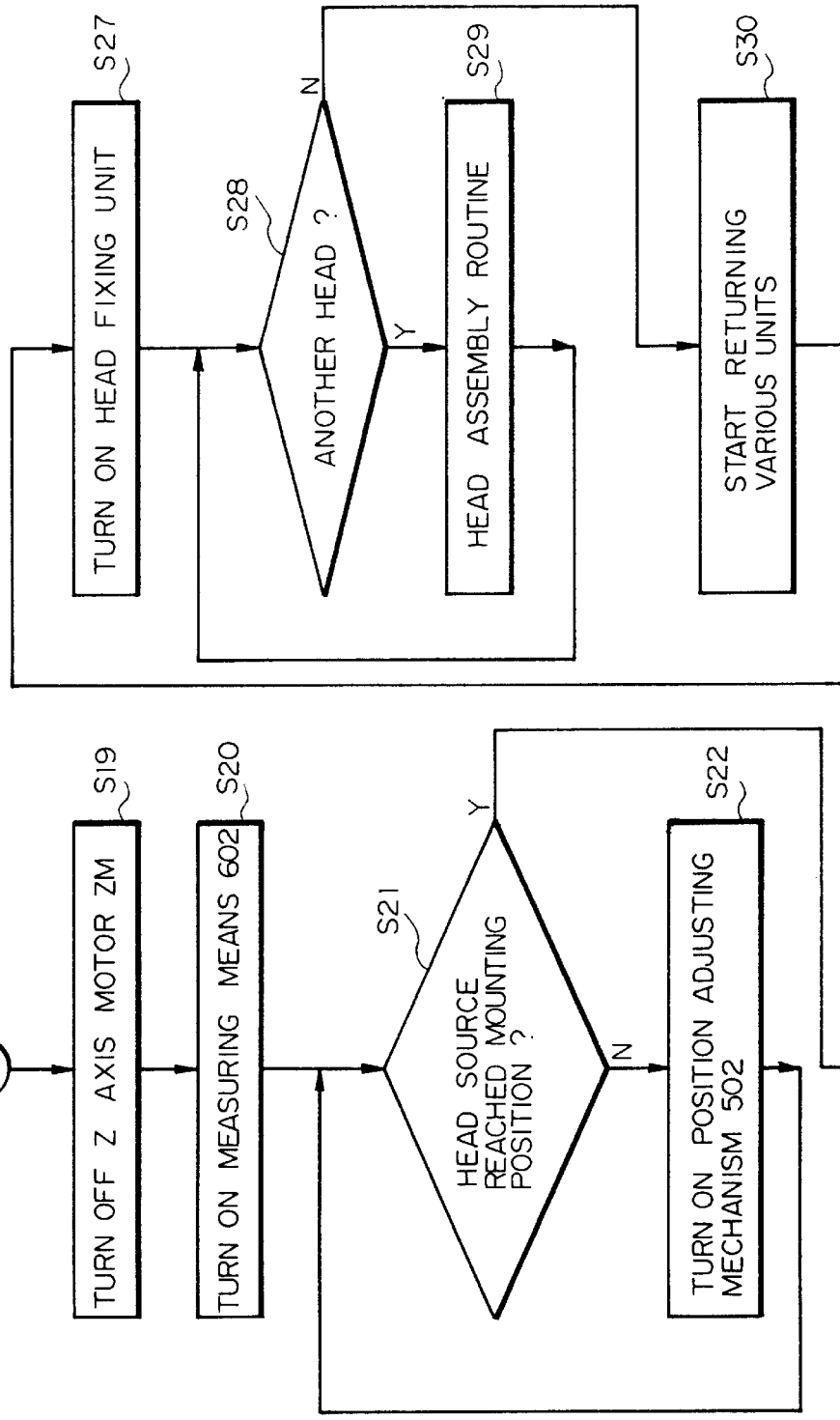
Figure 8:
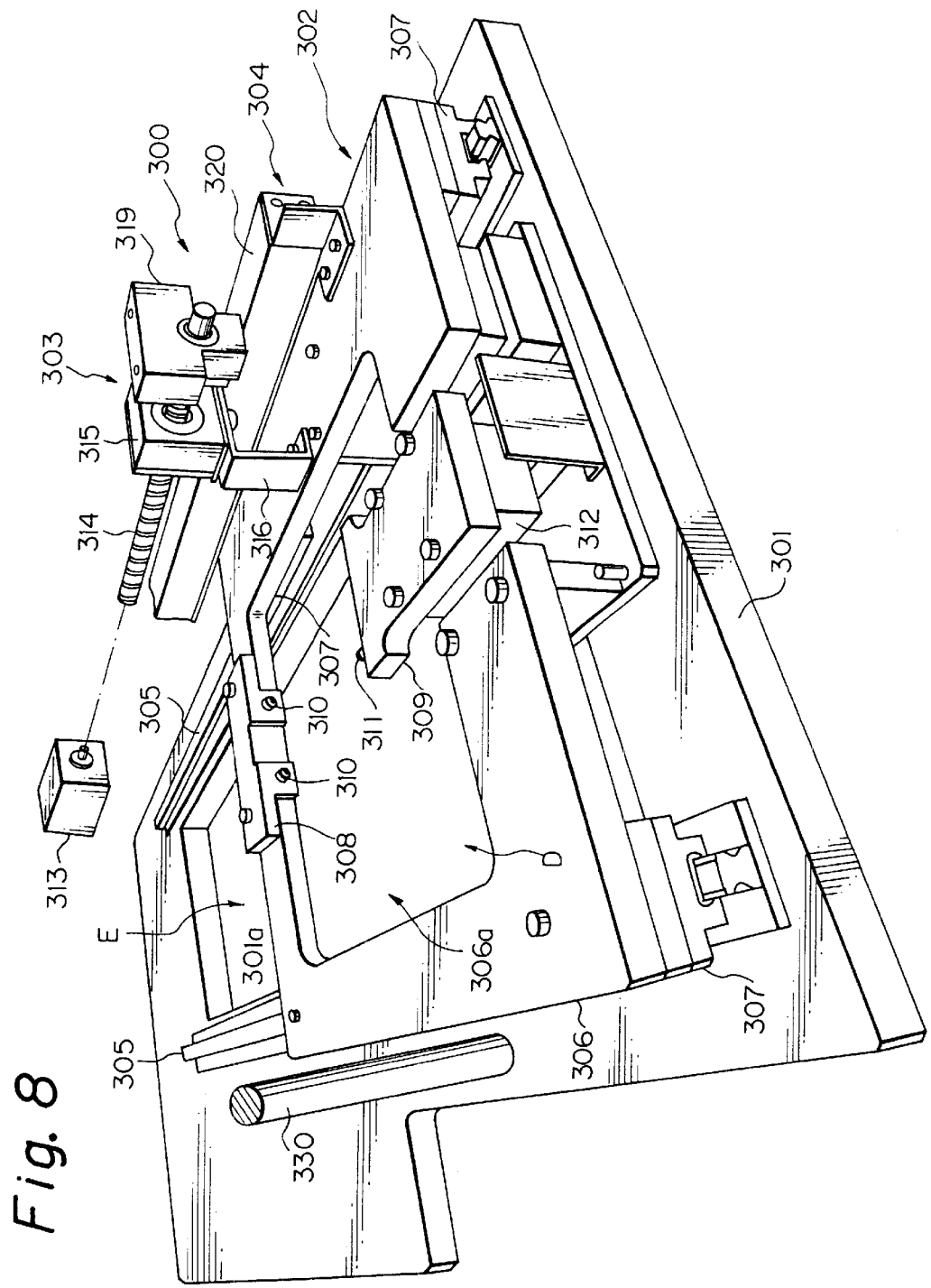
Figure 9:
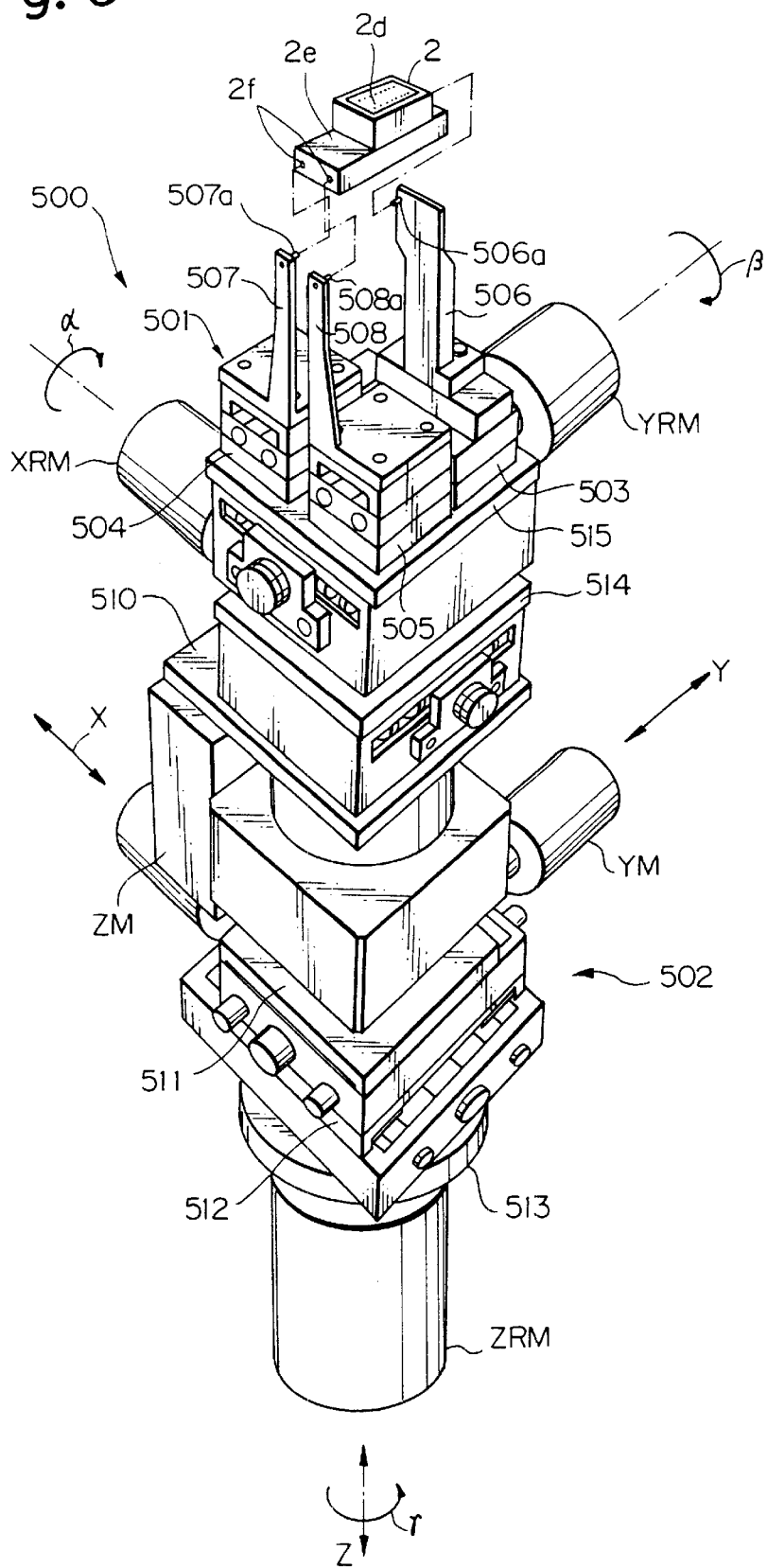
Figure 10A:
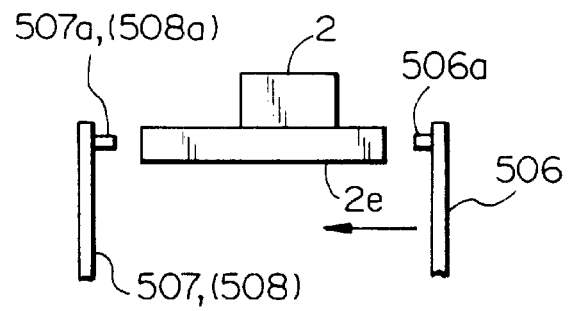
Figure 10B:
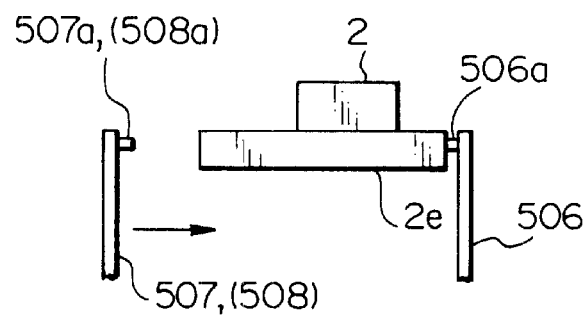
Figure 10C:
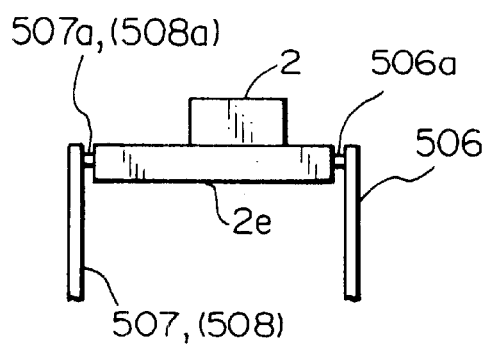
Figure 11:
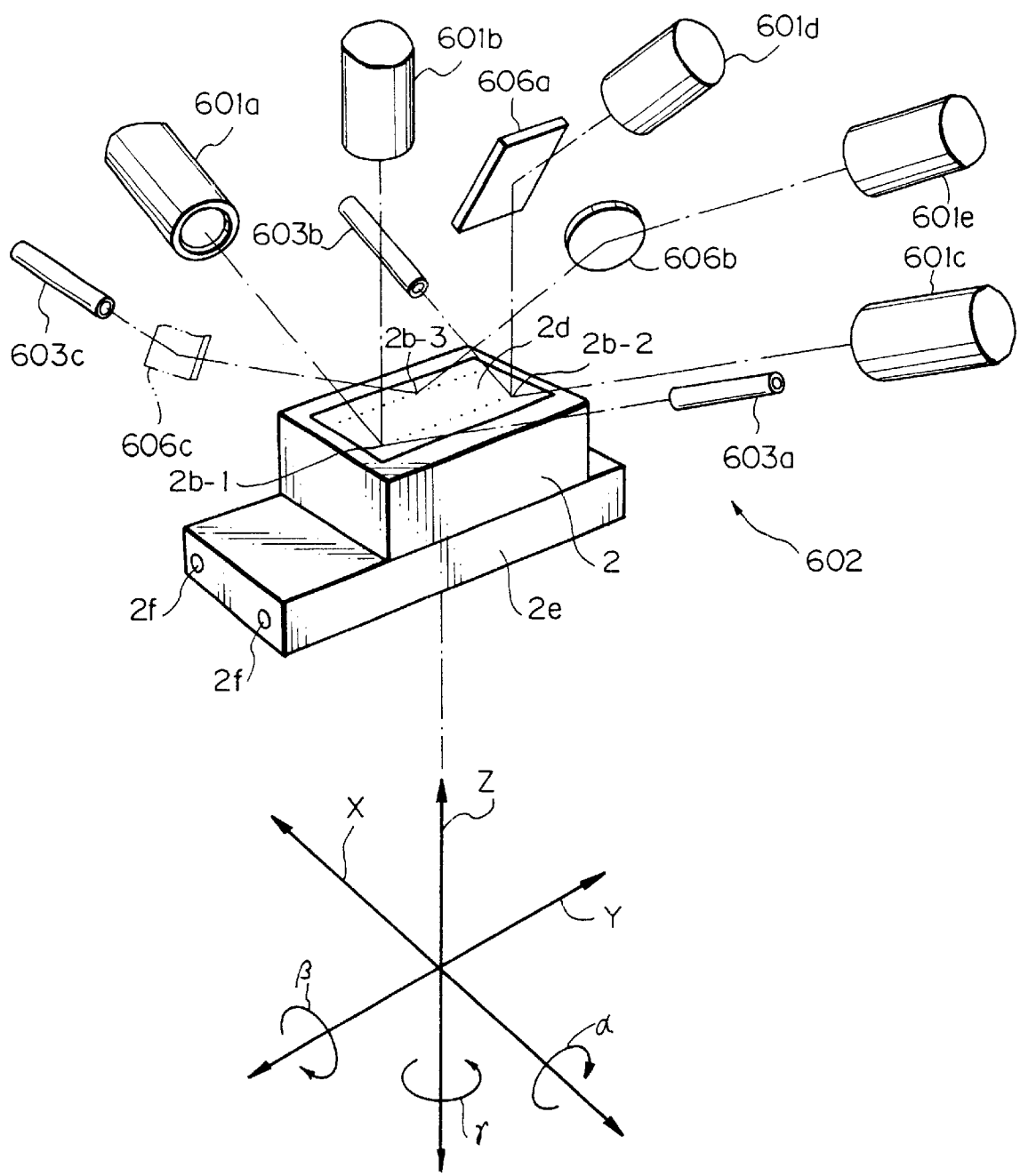
Figure 12:
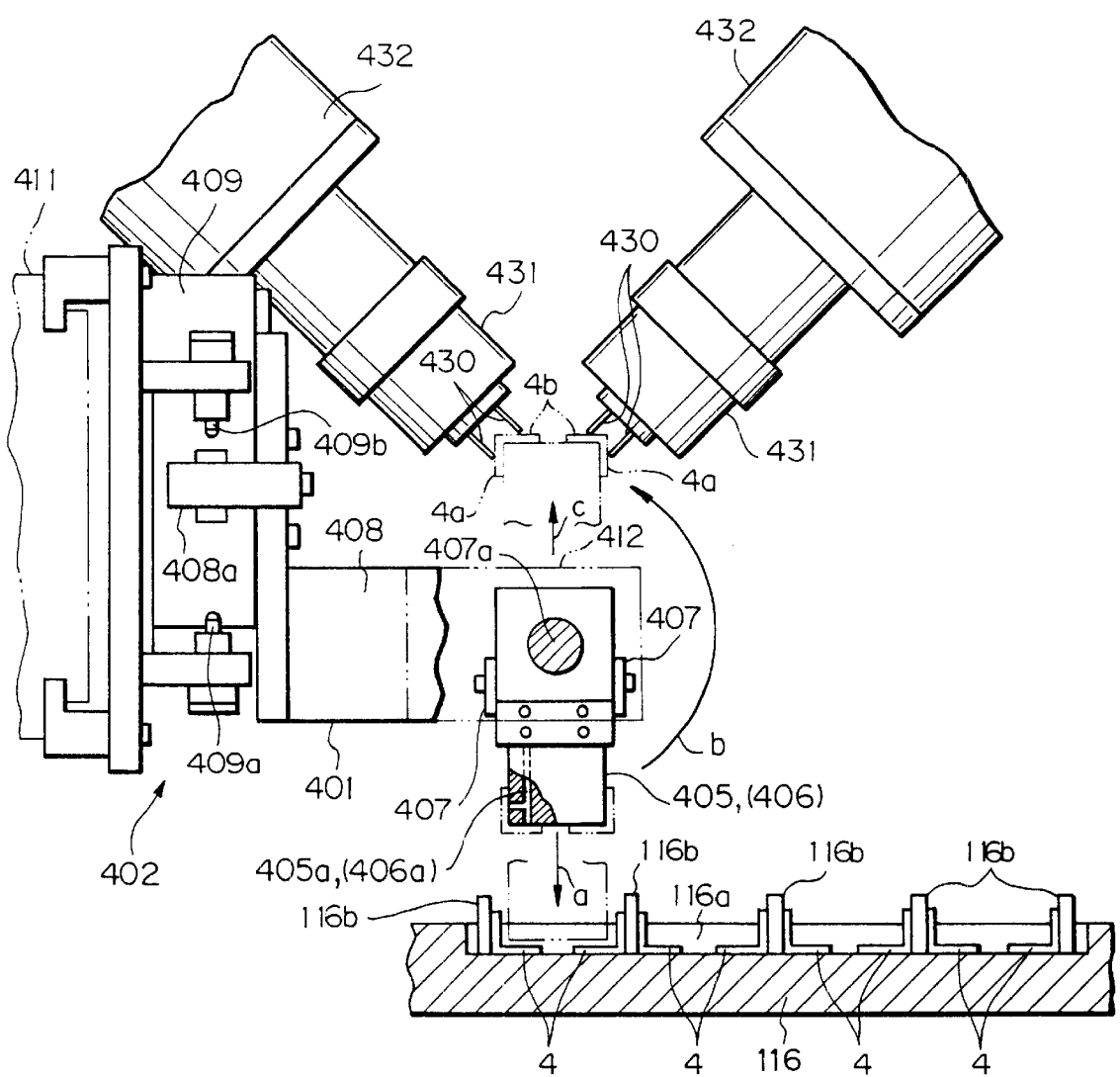
Figure 13A:
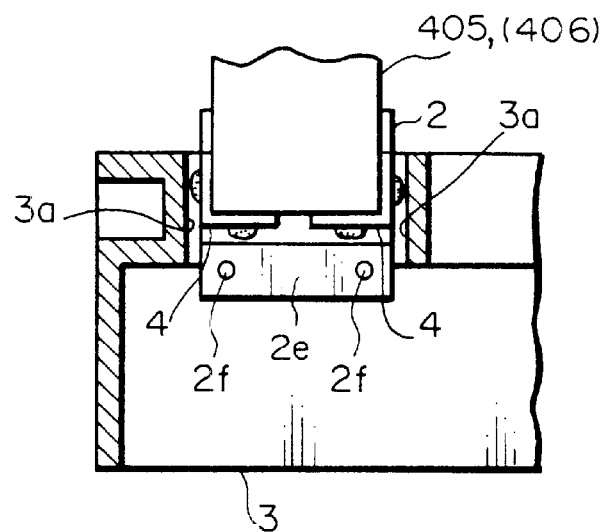
Figure 13B:
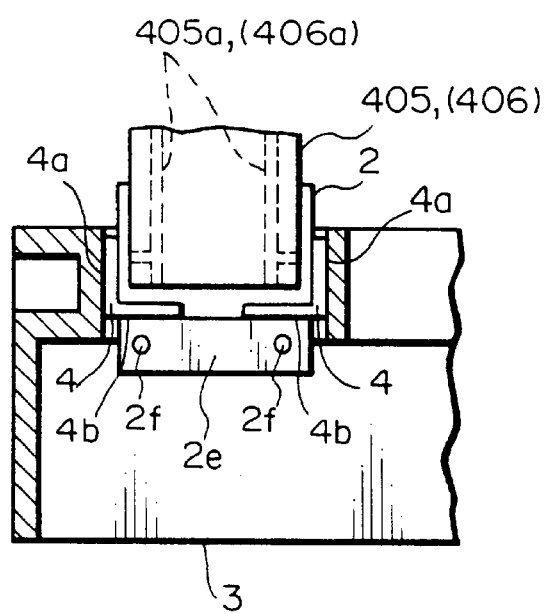
Figure 14:
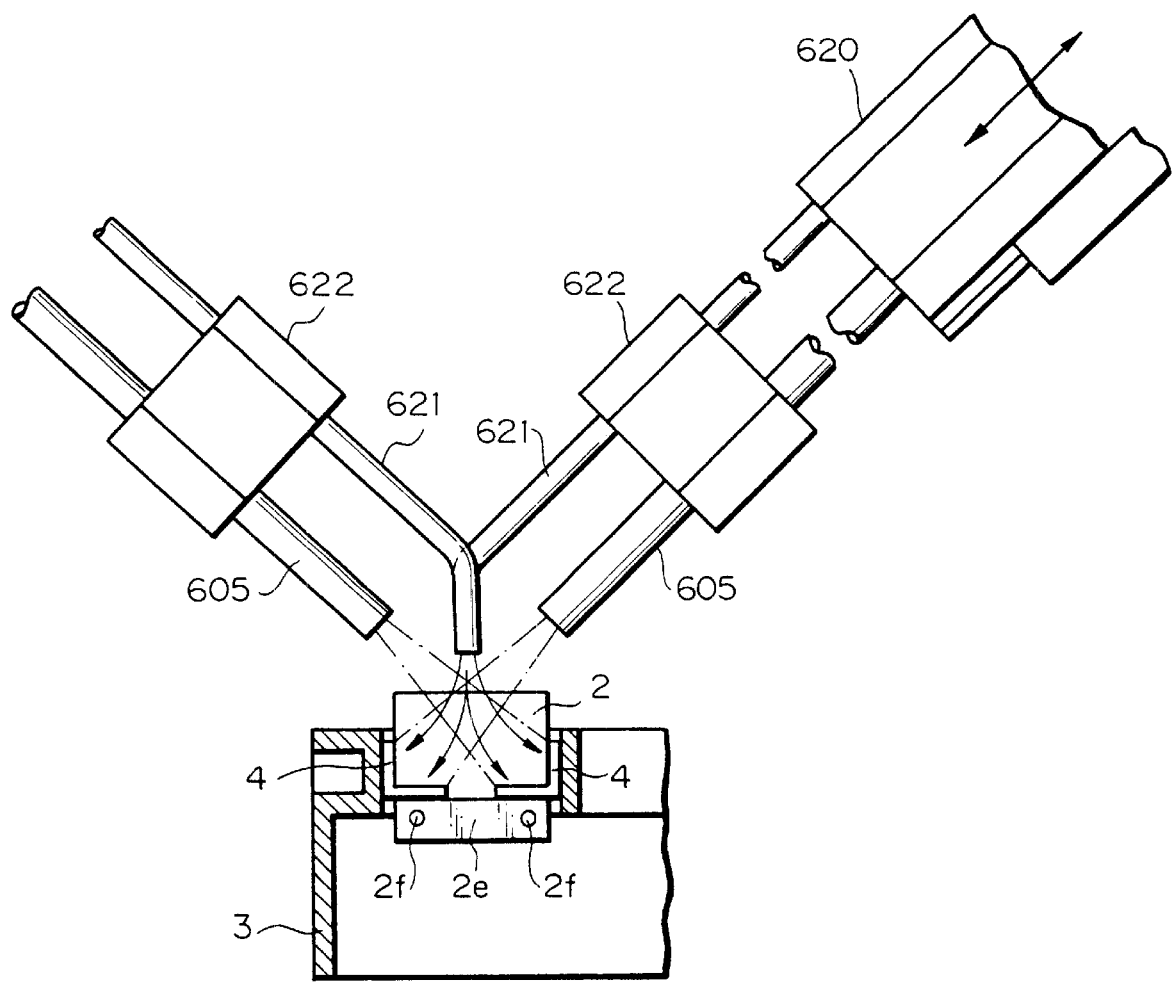
Figure 15:
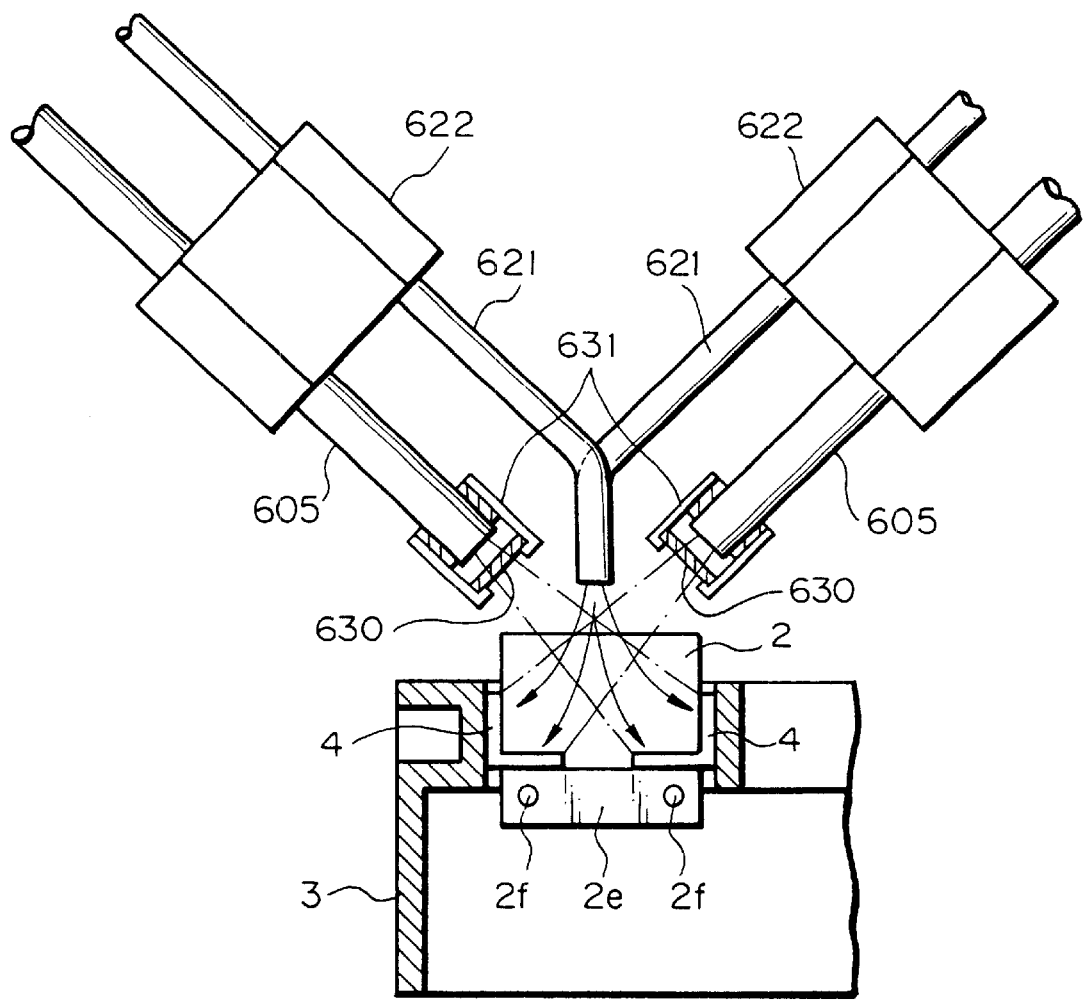
Figure 16A:
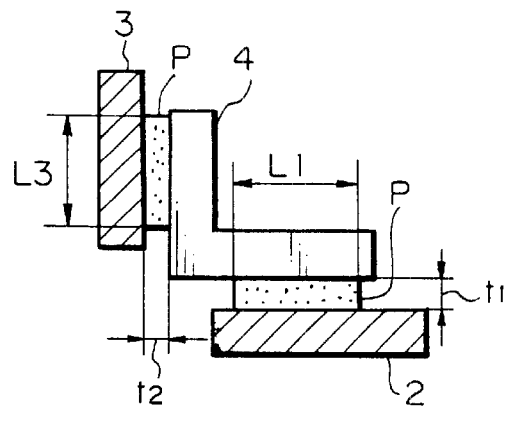
Figure 16B:
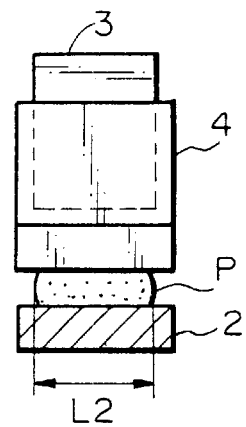
Figure 16C:
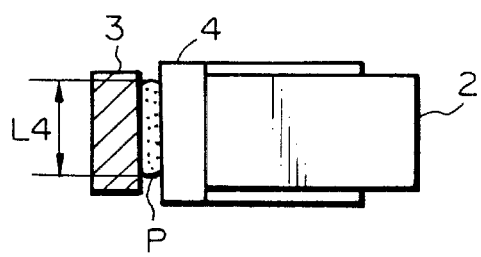
Figure 17A:
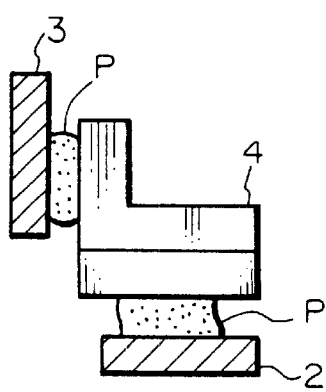
Figure 17B:
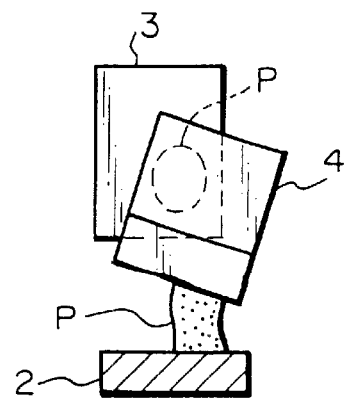
Figure 18:
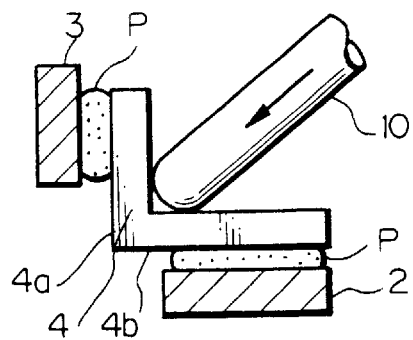
Figure 19A:
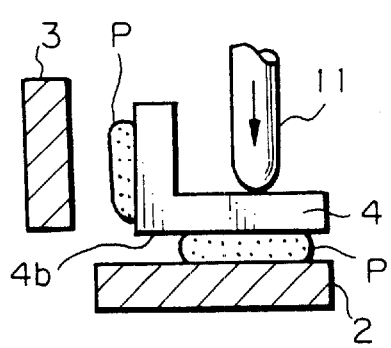
Figure 19B:
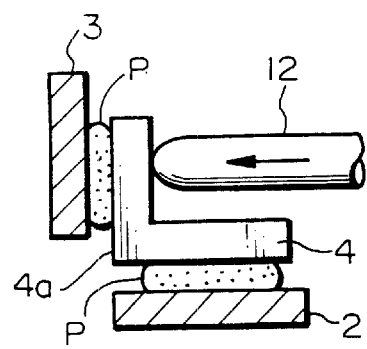
Figure 20:
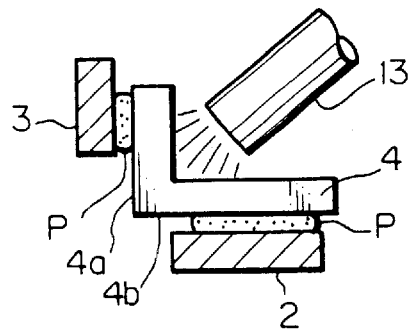
Figure 21A:
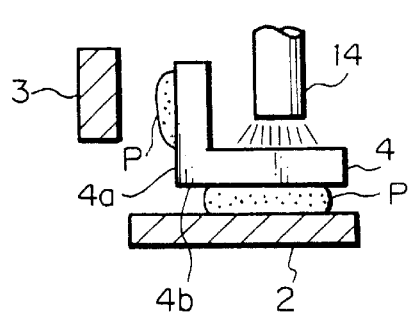
Figure 21B:
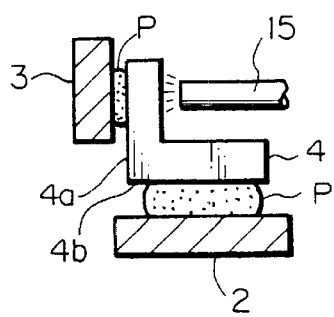
Figure 22:
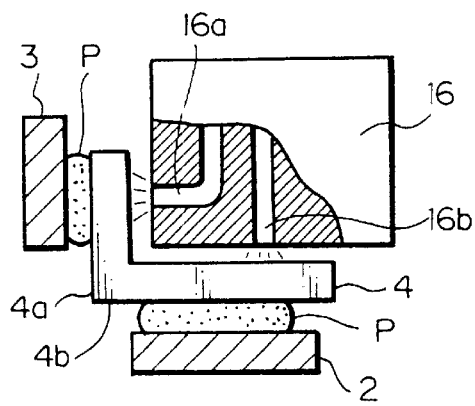
Figure 23A:
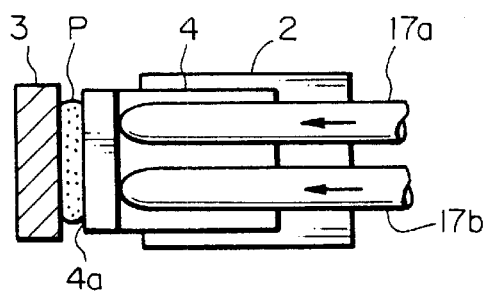
Figure 23B:
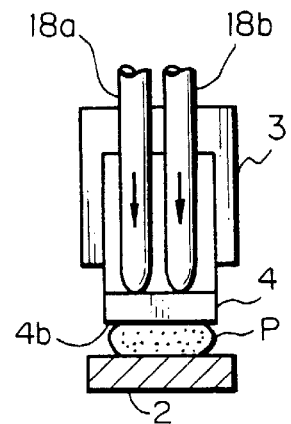
Figure 24A:
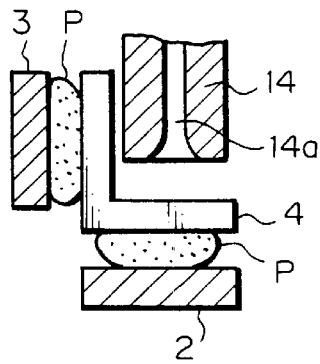
Figure 24B:
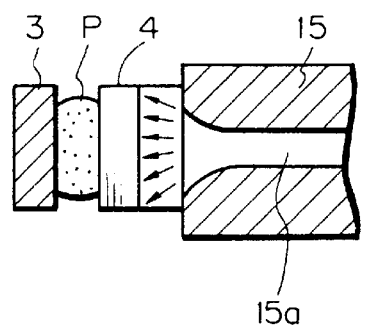
Figure 25:
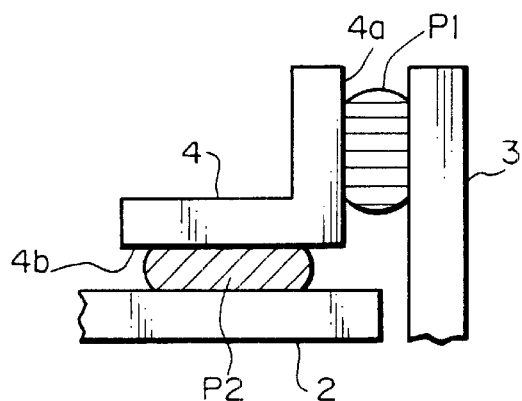
Figure 26:
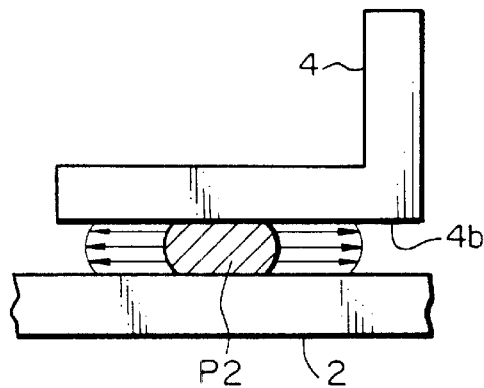
Figure 27:
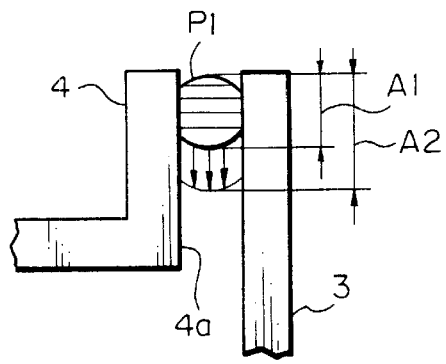
Figure 28:
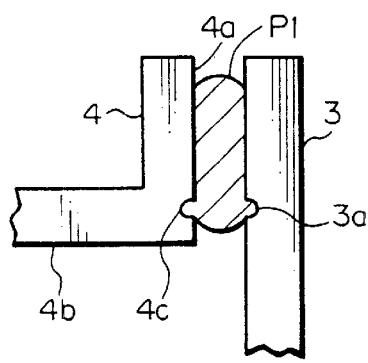
Figure 29:
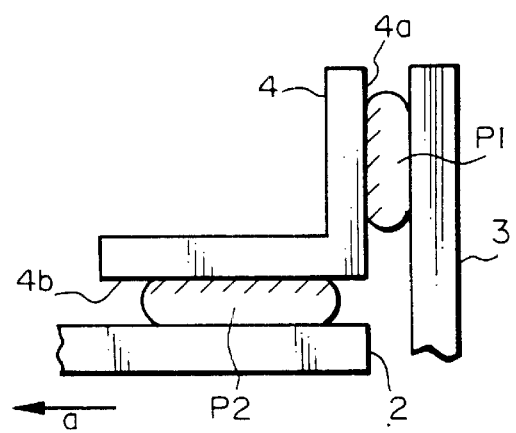
Figure 30:
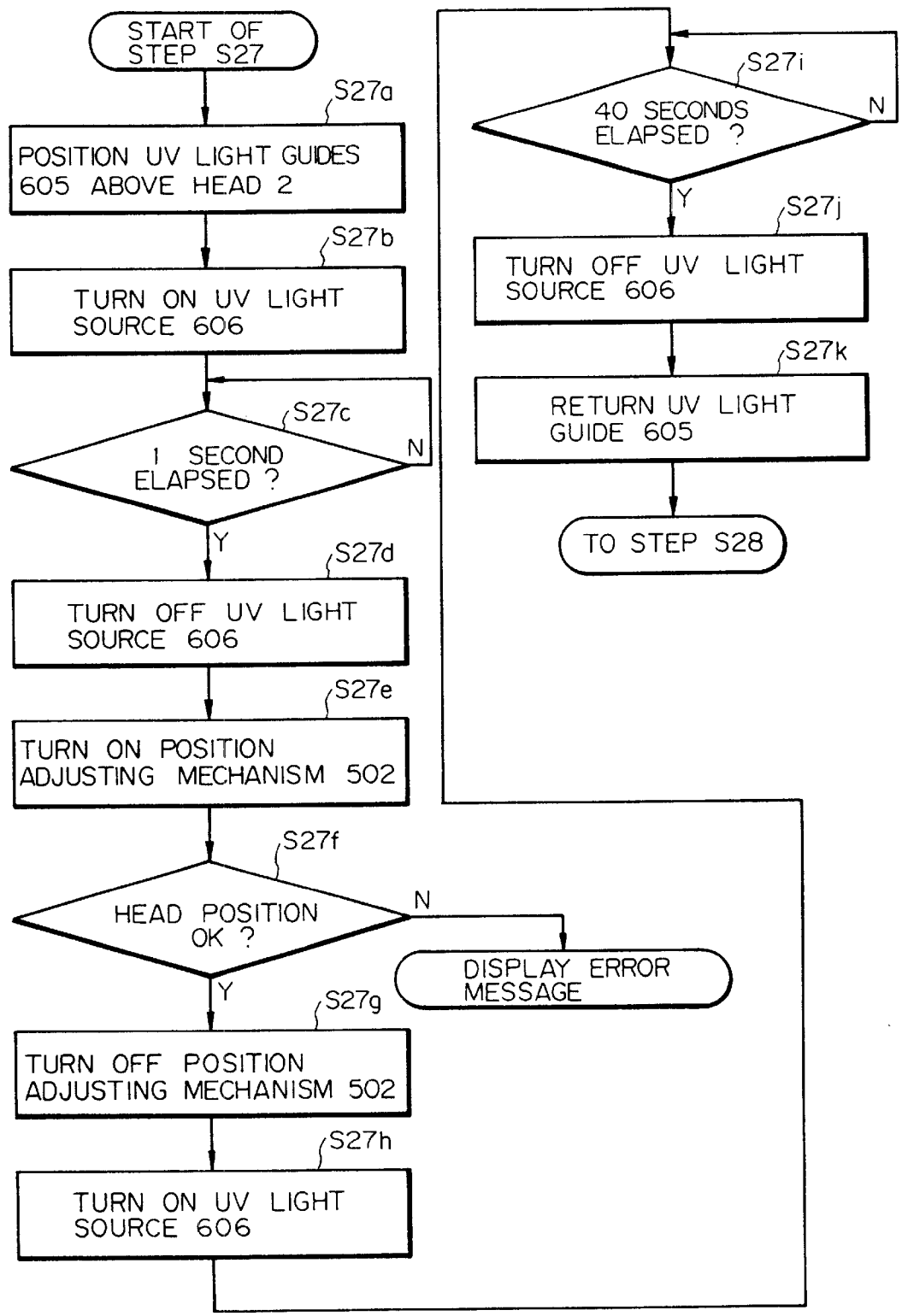
Figure 31A:
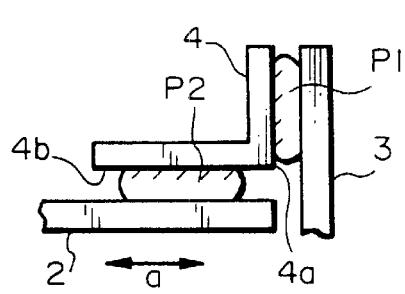
Figure 32A:
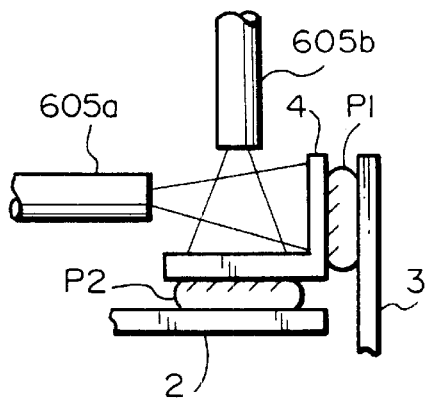
Figure 33:
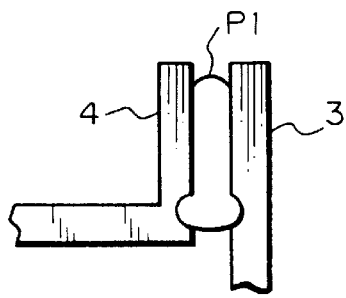

FIG, 2 is a block diagram schematically showing the illustrative embodiment;

FIG. 3 is a front view showing the general construction of the illustrative embodiment;

FIG. 4 is a perspective view showing the structural parts of the head unit and a jig for conveying the parts to a preselected mounting position;

FIGS. 5 and 6 are flowcharts demonstrating a specific operation of the illustrative embodiment;

FIG. 7 is a perspective view showing the jig positioned at a setting position defined on a set stage included in the illustrative embodiment;

FIG. 8 is a perspective view showing a mechanism provided on an assembly stage included in the illustrative embodiment for positioning the jig;

FIG. 9 is a perspective view showing a position adjusting unit for adjusting the position of the head surface of an ink jet head by holding the head:

FIGS. 10A–10C demonstrate a sequence of steps for causing head clamping means included in the position adjustment unit of FIG. 9 to clamp the ink jet head;

FIG. 11 is a perspective view of nozzle hole measuring means included in the illustrative embodiment for detecting preselected three of nozzle holes formed in the ink jet head;

FIG. 12 is a side elevation showing an intermediate member mounting unit for transferring intermediate members set on the jig to a preselected assembly position between a head support and the ink jet head, and adhesive applying means for applying UV (Ultra Violet) curable adhesive to the intermediate members;

FIGS. 13A and 13B are sections showing the behavior of the intermediate members transferred to the assembly position by the intermediate member mounting unit;

FIG. 14 is a side elevation a head fixing unit for curing the adhesive applied to the intermediate members with UV rays;

FIG. 15 shows a head fixing unit representative of an alternative embodiment of the present invention;

FIGS. 16A, 16B and 16C are respectively a front view, a side elevation and a plan view showing structural elements assembled in an adequate condition by the embodiment of FIG. 15;

FIGS. 17A and 17B are respectively a front view and a side elevation showing the structural elements assembled in an inadequate condition;

FIG. 18 is a front view showing a first example of the embodiment of FIG. 15;

FIGS. 19A and 19B are front views showing a second example of the embodiment of FIG. 15:

FIG. 20 is a front view showing a third example of the embodiment of FIG. 15;

FIGS. 21A and 21B are front views showing a fourth example of the embodiment of FIG. 15;

FIG. 22 is a front view showing a fifth example of the embodiment of FIG. 15;

FIGS. 23A and 23B are respectively a plan view and a side elevation showing a sixth example of the embodiment of FIG. 25;

FIGS. 24A and 24B are respectively a plan view and a front view showing a seventh example of the embodiment of FIG. 25;

FIG. 25 is a front view showing an eighth example of the embodiment of FIG. 15;

FIG. 26 is a front view for describing adhesive applied to a substantially horizontal second interface particular to the illustrative embodiment;

FIG. 27 is a front view for describing the viscosity of adhesive applied to a substantially vertical second interface particular to the illustrative embodiment;

FIG. 28 is a front view of a first interface between a part support and an intermediate member included in the illustrative embodiment;

FIG. 29 is a front view of the structural elements assembled by the illustrative embodiment;

FIG. 30 is a flowchart demonstrating a specific operation of the illustrative embodiment;

FIGS. 31A and 318 are front views showing a specific procedure for sequentially half-curing adhesive applied to the interfaces;

FIGS. 32A and 328 are front views showing another specific procedure for sequentially half-curing the adhesive; and FIG. 33 is a front view showing another specific configuration of the first interface between the part support and the intermediate member.

DESCRIPTION OF THE PREFERRED EMBODIMENTS

A preferred embodiment of the present invention will be described hereinafter. The embodiment is implemented as a head unit assembling apparatus for assembling an ink jet head unit (head unit hereinafter) included in a color ink jet printer by way of example.

Figure 1:
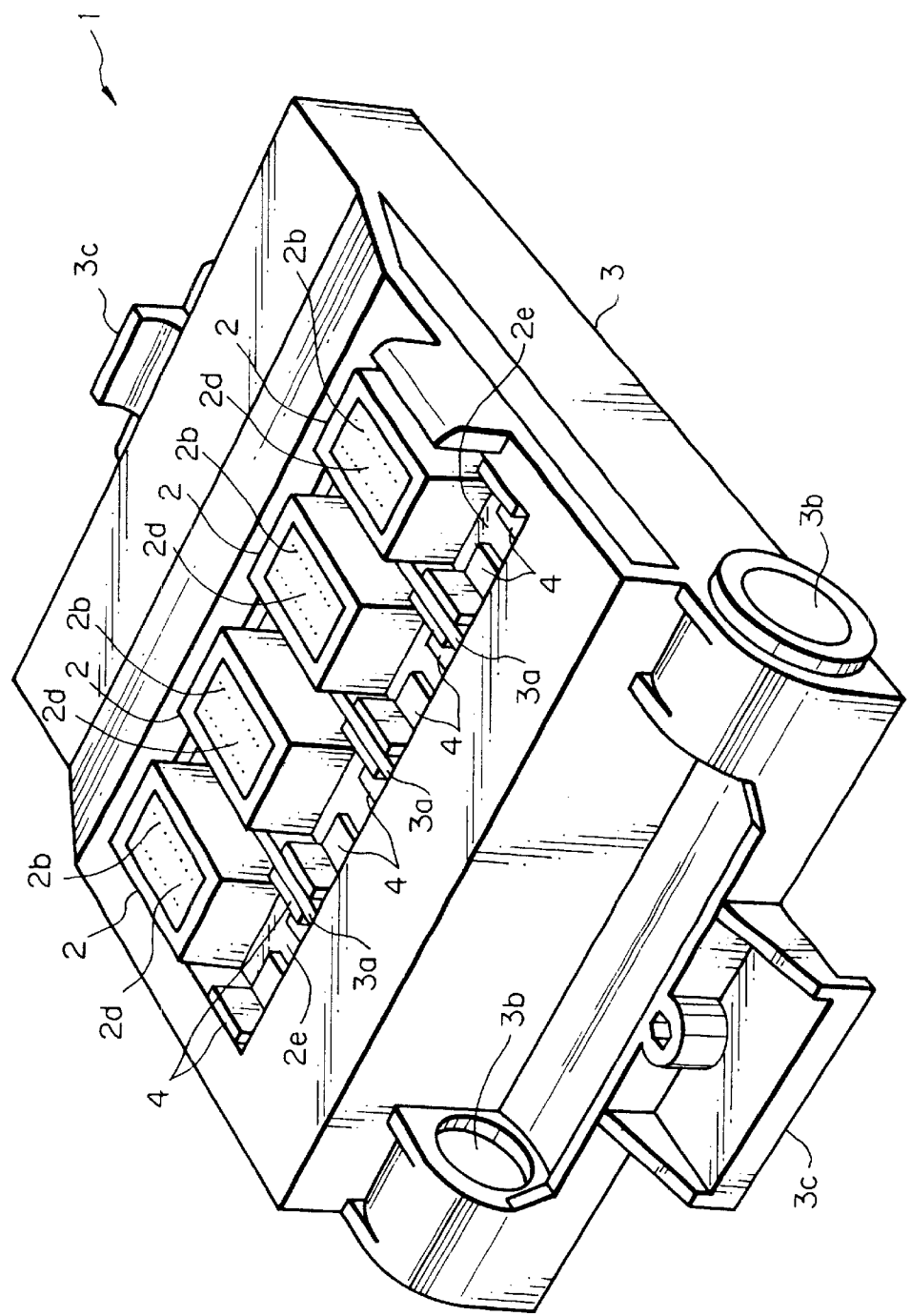
FIG. 1 is an external perspective view of a head unit assembled by an apparatus embodying the present invention.

FIG. 1 shows the general construction of the head unit to which the illustrative embodiment is applied. As shown, the head unit, generally 1, includes four heads or parts 2. A head support 3 supports the heads 2 and, in this sense, plays the role of a part support. Intermediate members 4 are arranged between the head support 3 and the heads 2 and adhered to connect them together. The heads 2 are therefore supported by the head support 3 via the intermediate members 4.

As shown in FIGS. 3 and 4, each head 2 includes a nozzle-like ink feed portion 2a for feeding ink from an ink cartridge, not shown, mounted to the back of the head 2. The ink fed via the ink feed portion 2a is ejected from a number of nozzle holes 2b in the form of fine drops toward a paper or similar recording medium. A control board, not shown, is mounted on the back of the head 2 for controlling the ejection timing of the ink drops via the nozzle holes 2b. A control signal, as well as other signals, is fed to the control board via a flexible flat cable 2c. The nozzle holes 2b of each head 2 are arranged in two arrays in a head surface 2d facing the paper, and each array extends in the direction of paper transport (subscanning direction).

As shown in FIG. 1, the head support 3 includes substantially vertical head support walls 3a supporting the heads 2 via the intermediate members 4 such that the head surfaces 2*d* are exposed from the back toward the front. The head support 3 is mounted on a head unit support shaft, not shown, and movable back and forth in the direction (main scanning direction) perpendicular to the direction of paper transport. The head unit support shaft is mounted on the body of the color printer. Specifically, slide bearings 3*b* are slidably mounted on the above head unit support shaft. A bracket 3*c* is positioned at the roar of the head support 3 in order to hold ink cartridges respectively mounted to the ink feed portions 2*a* of the heads 2.

Each head 2 is adhered to the head support walls 3*a* via four intermediate members 4. As shown in FIG. 4, each intermediate member 4 is implemented by a generally L-shaped piece having a substantially perpendicular first surface 4*a* and a substantially horizontal second surface 4*b*. The first surface 4*a* is parallel to the head support wall 3*a* of the head support 3 while the second surface 4*b* is parallel to the upper surface of a base portion 2*e* included in the head 2. The control board mentioned earlier is built in the base portion 2*e*. The intermediate members 4 are formed of transparent resin transparent for UV rays, so that UV curable adhesive applied to the surfaces 4*a* and 4*b* can be cured via the members 4.

Figure 2:
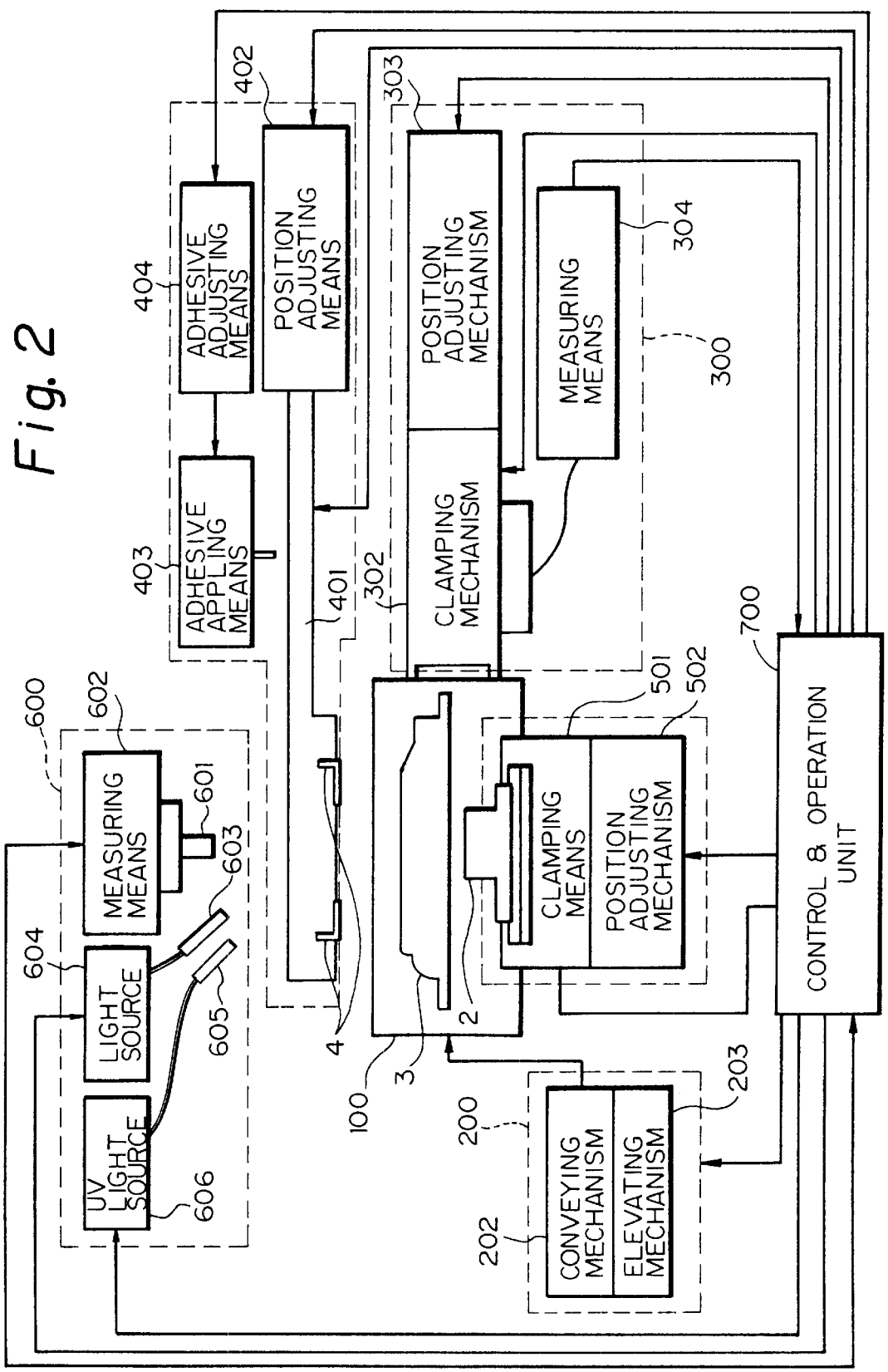

FIG. 2 is a block diagram schematically showing the apparatus for assembling the head unit 1. FIG. 3 shows a specific structure of the apparatus. As shown, the apparatus includes a jig 100, a jig conveying unit or jig conveying means 200, a jig positioning unit 300, an intermediate member mounting unit 400, a head position adjusting unit 500, a nozzle position measuring and head fixing unit 600, and a control and operation unit 700.

The jig 100 is loaded with the parts of the head unit 1, i.e., the heads 2, head support 3, and intermediate members 4 to be assembled.

As shown in FIG. 3, the illustrative embodiment includes two jigs 100 respectively located at setting positions A and B defined on a set stage 201. The jig conveying unit 200 includes a conveying mechanism 202. The conveying mechanism 202 conveys the jig 100 back and forth between the setting position A or B and an elevating position C defined on the set stage 201 where the jig 100 is movable in the up-and-down direction. An elevating mechanism 203 moves the jig 100 located at the elevating position C up and down between the set stage 201 and an assembly stage 301 positioned above the set stage 201.

The jig positioning unit 300 includes a clamping mechanism 302 for clamping the jig 100 raised to the assembly stage 301. A position adjusting mechanism 303 moves the clamping mechanism 302 clamping the jig 100 back and forth between an elevating position D and an assembling position E (see FIG. 8) defined on the assembly stage 301, thereby adjusting the stop position of the jig 100 on the stage 301. Measuring means 304 measures the position of the jig 100 moved by the position adjusting mechanism 303.

The intermediate member mounting unit 400 includes a holding mechanism 401 for holding the intermediate members 4 set on the jig 100 that is located at to the assembling position E. The holding mechanism 401 causes the intermediate members 4 to face a preselected adhesive applying positions. A position adjusting mechanism 402 moves the holding mechanism 401 holding the intermediate members 4 to a preselected mounting position between each head 2 and the head support 3 set on the jig 100, thereby adjusting the mounting position of the members 4. Adhesive applying means 403 applies UV curable adhesive to the intermediate members 4 held by the holding mechanism 401. Adhesive adjusting means 404 adjust the amount of the adhesive to be applied to the intermediate members 4 by the applying means 403.

The head position adjusting unit 500 includes head clamping means 501 for clamping each head 2 set on the jig 100 having been brought to the assembling position E. A position adjusting mechanism 502 moves the head clamping means 501 in the directions parallel to the X axis which is parallel to the direction of movement of the jig clamping mechanism 302, directions parallel to the Y axis and the Z axis perpendicular to the X axis, and directions of rotations $\alpha$, $\beta$ and $\gamma$ having centers of rotation respectively defined by the X, Y and Z axes, i.e., in six different directions in total. The position adjusting mechanism 502 adjusts the position of the head 2 clamped by the clamping means 501.

The nozzle position measuring and head fixing unit 600 includes a CCD camera or part position detecting means 601 for detecting the nozzle holes 2*b* of each head 2. Measuring means 602 measures the position of preselected ones of the nozzle holes 2*b* on the basis of data output from the CCD camera 601. A light source 604 illuminates the nozzle holes 2*b* to be detected by the camera 601 via a halogen light guide 603. A UV ight source 606 illuminates, via UV light guides 605, the intermediate members 4 brought to the preselected mounting position with UV rays.

The control and operation unit 700 includes a host controller or sequencer and a subcontroller or personal computer. The host controller mainly controls the operation of units driven by air cylinders. The subcontroller controls the operation of units driven by motors and performs logical and arithmetic operations with image data and measured data output from the various measuring means.

Reference will be made to FIGS. 5 and 6 for describing a specific operation of the illustrative embodiment. A program for executing the operation to be described is stored in, e.g., a ROM (Read Only Memory) included in the control and operation unit 700 beforehand and starts when a main switch, not shown, included in the apparatus is turned on.

First, the apparatus is initialized (step S1). By the initialization, the various units of the apparatus each is returned to the respective home position. For example, the jigs 100 are respectively brought to the setting positions A and B or the set stage 201. The operator sequentially sets the various parts of the head unit 1 on the jigs 10 located at the positions A and B (step S2).

Specifically, each jig 100 is made up of a head support holding portion, a head supporting portion, and an intermediate member supporting portion. The head support holding portion holds the head support 3 such that the support 3 remains in its orientation for assembly maintains its portions for receiving the heads 2 and intermediate members 4 open or freely accessible. The head supporting portion supports the heads 2 in such a manner as to guarantee a region for adjusting the positions of the heads 2 relative to the head support 3 positioned on the head support holding portion. The intermediate member supporting portion supports the intermediate members 4 in such a position that the members 4 can be transferred to the head support 3 positioned on the head support holding portion.

As shown in FIGS. 3, 4 and 7, the head support holding portion includes a stationary stub 102 fixed to a rear side wall 101 included in the jig 100. A movable stub 104 is mounted on a front side wall 103 also included in the jig 100 and faces the stationary stub 102. The movable stub 104 is movable toward end away from the stationary stub 102. A push-down member 106 is mounted on a pair of brackets 105 respectively fixed to the upper right portions of the inner surfaces of the side walls 101 and 103. Three push-up members 107 are positioned on the bottom wall 113 of the jig 100 in order to push up the head support 3. The stubs 102 and 104 each has the same outside diameter as the head unit support shaft mentioned earlier. A lug 106a protrudes from substantially the center of the underside of the push-down member 106. The lug 106a faces the bracket 3c of the head support 3 remote from the slide bearings 3b.

The movable stub 104 extends throughout the side wall 103 and is fixed to a bracket 108 positioned outside of the side wall 103. Another bracket 109 is mounted on the outer surface of the side wall 103. The bracket 108 is mounted on a shaft 110 journalled to the bracket 109 and side wall 103 and is slidable in the direction parallel to the axis of the movable stub 104. A coil spring 111 is wound round the shaft 110 and constantly biases the bracket 108 toward the side wall 103. A lever 112 to be operated by hand is mounted on the bracket 102 and received in a guide slot 109a formed in the bracket 109.

The head support 3 is set on the head support holding portion by the following procedure. Before setting the head support 3, the operator pulls the lever 112 toward the operator against the action of the coil spring 111 and locks it in a locking portion included in the guide slot 109a. As a result, the movable stub 104 moves toward the outside of the side wall 103, making the distance between the surfaces of the stubs 104 and 102 facing each other greater than the maximum width between the slide bearings 3b. In this condition, the operator coupled the rear slide bearing 3b of the head support 3 to the stationary stub 102 and unlocks the lever 112. Consequently, the movable stub 104 mates with the front slide bearing 3b of the head support 3 due to the action of the coil spring 111. Subsequently, the operator sets the three push-up members 107 to a preselected height and mounts the push-down member 106 to the brackets 105. The lug 106a of the push-down member 106 pushes the bracket 3c of the head support 3 downward.

By the above procedure, the head support 3 is set at a preselected position on the jig 100. In the head support holding portion, the stationary stub 102 and movable stub 104 support the slide bearings 3b of the head support 3 in the same manner as the head unit support shaft which allows the heads 2 to move in the main scanning direction, as stated above. Therefore, by using the stubs 102 and 104 as a reference axis for mounting the heads 2 to the head support 3, it is possible to extremely accurately position the heads 2 relative to the head support 3. In addition, the three push-up members 107 positioned on the bottom wall 113 of the jig 100 support the back of the head support 3 and thereby insure the horizontal position of the head support 3.

The head supporting portion is implemented by a head support member 115 fixed to the side wall is 101 and 103 at substantially the intermediate between the side walls 101 and 103. The head support member 115 is located at a position allowing the heads 2 to be adjusted in position relative to the head support 3 positioned on the head support holding portion. As shown in FIGS. 3, 4 and 7, the head support member 115 is formed with four surfaces 115a for positioning the base portions 2e of the four heads 2. Holes 115b are formed in the head support member 115 such that when the heads 2 are laid on the surfaces 115a, the ink feed portions 2a of the heads 2 are respectively received in the holes 115b. A cable pocket 115c is also formed in the head support member 115 for accommodating the flexible flat cables 2c of the heads 2. The head support member 115 is configured such that when the heads 2 are laid on the surfaces 115a, the heads 2 each faces the lower portion of the respective head mounting portion between the head support walls 3a of the head support 3 (see FIG. 3).

The ink feed portion 2a of each head 2 is received in the respective hole 115b of the head support member 115, thereby positioning the head 2 on the respective surface 115a. This eliminates the need for special positioning means. When the heads 2 are positioned on the head support member 115, the cables 2c of the heads 2 are accommodated in the cable pocket 115a. Therefore, the clamping means 501 which will be described later can clamp the heads 2 without being obstructed by the cables 2c.

The intermediate member supporting portion is implemented by a flat intermediate member support member 116 similar to the head support member 115. The intermediate member support member 116 is fixed to the upper left portions of the inner surfaces of the side walls 101 and 103 and substantially parallel to the bottom wall 113. As shown in FIGS. 3, 4 and 7, two parallel grooves 116a are formed in the support member 116 perpendicularly to the side walls 101 and 103. Positioning pins 116b are studded on the bottom of each groove 116a at equally spaced locations. Each intermediate member 4 is positioned on the support member 116 with its first surface 4a and second surface 4b respectively contacting any one of the pins 116b and the bottom of either one of the grooves 116a.

The distance between the grooves 116a, the width of each groove and the distance between the positioning pins 116b are selected such that when the intermediate members 4 are set on the intermediate member support member 116, the members 4 have substantially the same arrangement as when they are mounted to the head support 3 and heads 2. This successfully simplifies the adjustment of the positions of the intermediate members 4 to be effected by the holding mechanism 401 and position adjusting mechanism 402 which will be described later, and therefore the configurations and control of the mechanism 401 and 402.

As shown in FIGS. 4 and 7, the jig 100 includes two stays 114 in addition to the bottom wall 113 and has an open top. Therefore, the parts of the head unit 1 can be set on the jig 100 from above the jig 100. This promotes rapid setting of the parts and rapid removal of the head unit 1 and enhances the free layout of the nozzle position measuring and fixing unit 600. Further, an opening 113a is formed in the bottom well 113 below the head support member 115, so that the clamping means 501 which will be described can reach the inside of the head support 3 from the back side, The clamping means 501 is allowed to clamp each head 2 from the back side of the head support 3, as stated above. It follows that the nozzle position measuring and fixing unit 600 can be laid out with greater freedom above the head support 3, and the head unit 1 can be reduced in size and increased in strength. By contrast, if the head 2 is mounted to the head support 3 from above the head support 3, then each opening 3d (see FIG. 4) formed in the head support 3 for receiving the head 2 must be greater in size than the base portion 2e of the head 2. This increases the distance between the nearby walls 3a of the head support 3 and therefore the size of the head support 3 while reducing the strength of the walls 3a holding the heads 2.

After the parts of the head unit 1 have been set on the jig 100 by the above procedure, a step S3 shown in FIG. 5 is executed. In the step S3, whether or not the operator has turned on start switches SW1 and SW2 substantially at the same time for causing the conveyance of the jig 100 to start. As shown in FIG. 3, the start switches SW1 and SW2 are positioned on the set stage 201 in the vicinity of the opposite setting positions A and B at a suitable distance, so that they will not turn on unless the operator touches them with both hands. This prevents the operator's hands from being hurt when the jig 100 starts moving.

The jig conveying mechanism 202 for conveying the jig 100 includes two cylinders 204a and 204b. When the two start switches SW1 and S52 are turned on substantially at the same time, the cylinder 204a, for example, assigned to the setting position A is turned on (step S4)

The cylinders 204a and 204b each is implemented by an air cylinder and mounted on a cylinder guide shaft 205 (see FIGS. 3 and 7) in such a manner as to be movable back and forth. The cylinder guide shaft 205 is supported by a pair of brackets 206 mounted on opposite sides of the set stage 201 and extends in parallel to the set stage 201. Bases 207a and 207b are respectively loaded with the jigs 100 and position them at the setting positions A and B. The cylinders 204a and 204b are respectively fixed to the lower portions of the bases 207a and 207b via cylinder brackets 208.

The bases 207a and 207b carry the jigs 100 identical in configuration with each other. The following description will concentrate on the base 207a located at the setting position A, i.e. the left position in FIG. 3 by way of example.

As shown in FIGS. 3 and 7, the jig elevating mechanism 203 which will be described includes a table 209 for elevating the jig 100. The four sides of the bottom wall 113 of the jig 100 can be positioned at substantially the center of the upper surface of the base 207a. An opening 207c great enough to receive the table 209 is formed in substantially the center of the base 207a. A plate 210 formed of acrylic resin is fitted on the base 207a around the opening 207a, so that the jig 100 will be positioned slightly above the upper surface of the base 207a.

Five crank-like jig positioning members 211 are fixed to the upper surface of the base 207a at the front, rear and left of the plate 210, as viewed in FIG. 7, such that the members 211 respectively contact three sides of the bottom plate 113. A pair of guide rails 212 are provided on the set stage 201. Rail guides 213 are provided at four corners of the underside of the table 207a and respectively slidably engaged with the guide rails 212. The guide rails 212 are parallel to the cylinder guide shaft 205. A presser 214 is positioned at the right-hand side of the base 207a in order to stop the jig 100 against inertia when the base 207a is brought to a stop.

When the cylinder 204a is turned on (step S4), the jig conveying mechanism 202 moves the base 207a from the setting position A, FIG. 3, to the elevating position C. When the bracket 208 of the cylinder 204a abuts against a stop 215 located at substantially the center of the set stage 201, the cylinder 204a stops moving. The position where the cylinder 204a stops moving is selected such that when the cylinder 204a stops, the table 209 of the jig elevating mechanism 203 faces substantially the center of the opening 207c of the base 207a.

When the jig 100 is brought to a stop at the elevating position C, i.e., at substantially the center of the set stage 201, the presser 214 driven by an air cylinder, not shown, stops pressing the jig 100. Then, a cylinder 216 for moving the table 209 up and down is turned on (step S5) in order to elevate the table 209. The cylinder 216 also implemented by an air cylinder is constructed to raise or lower a table support 209 supporting the table 209 when turned on or turned off. As shown in FIGS. 3 and 7, the cylinder 216 is mounted on a support plate 218 which is mounted on the underside of the set stage 201 via a cylinder stay 218.

A positioning pin 220 is studded on the upper surface of the table 209 while a hole 221 for receiving the pin 220 is formed in the bottom wall 113 of the jig 100. When the cylinder 216 is turned on to raise the table 209, the positioning pin 220 enters the hole 221 with the result that the jig 100 is positioned on the table 209. As the table 209 is further raised, the jig 100 set on the base 207a and brought to the elevating position C is transferred to the table 209. As a result, as shown in FIG. 3, the jig 100 is raised by the table 209 to the elevating position C of the assembly stage 301 positioned above the set stage 201.

As shown in FIGS. 3 and 8, a relatively large elongate opening 301a is formed in substantially the center of the assembly stage 301. The opening 301a has a width allowing the jig 100 to pass therethrough and a length spanning the distance between the elevating position D and the assembling position E. A pair of guide rails 305 extend on the upper surface of the assembly stage 301 at both sides of and in the lengthwise direction of the opening 301a. The guide rails 305 extend perpendicularly to the direction in which the jig 100 is moved on the set stage 201, thereby guiding the jig positioning unit 300.

Rail guides 307 are mounted on four corners of the underside of a base 306 on which the clamping mechanism 302 is mounted. The rail guides 307 are engaged with the guide rails 305, so that the base 306 is movable back and forth along the guide rails 305. The base 306 has a channel-like configuration surrounding the path along which the jig 100 is elevatable. The clamping mechanism 302 includes a stationary clamp member 308 and a movable clamp member 308 respectively positioned at the rear and the front of the base 306.

Two clamp pins 310 are studded on the stationary clamp member 308 and respectively mate with holes 118a (see FIG. 7) formed in a member 118 to be clamped and mounted on the rear side wall 101 of the jig 100. A single clamp pin 311 is studded on the movable clamp member 309 and mates with a single hole 119a formed in a member 119 to be clamped and mounted on the front side wall 103. A cylinder 312 implemented by an air cylinder drives the movable clamp member 309 toward and away from the stationary clamp member 308. The movable clamp member 309 is usually retracted to the front side of the base 306 such that the clamp pin 311 does not protrude into the elevation path of the jig 100. An opening 306a is formed in the base 306 in such a position that when the movable clamp member 309 is retracted, the clamp pins 310 of the stationary clamp member 308 and the clamp pin 311 of the movable clamp member 309 each is positioned outside of the elevation path of the jig 100.

When the cylinder 216 is turned on (step S5, FIG 5), the table 209 raises the jig 100 to the elevating position D on the assembly stage 301, i.e., the position where the clamp pins 310 and 311 respectively face the members 118 and 119a. When the jig 100 is brought to a stop at the position D, the cylinder 312 is turned on (step S6).

When the cylinder 312 is turned on, it moves the movable clamp member 309 toward the stationary clamp member 308. As a result, the clamp pins 310 and 311 of the clamp members 309 and 308 respectively mate with the holes 118a and 119a of the jig 100, so that the jig 100 is clamped by the base 306. Subsequently, a motor 313 included in the position adjusting mechanism 303 is turned on for moving the base 306 back and forth along the guide rails 305 (step S7).

As shown in FIG. 8, the motor 313 is a reversible motor for driving a ball screw 314 via a speed reduction gear not shown. A ball nut 315 including a steel ball is held in threaded engagement with the ball screw 314. The ball nut 315 is fixed to the base 306 via a channel-shaped bracket 316. As shown in FIGS. 3 and 8, the motor 313 is mounted on screen-like support members 317 mounted on the right portion of the assembly stage 301 at the front side and rear side, respectively (only the rear support member is shown). A support plate 318 is fixed between the upper surfaces of the support members 317. The ball screw 314 is journalled to bearings 31 respectively fixed to the front end and rear end of the support plate 318.

When the motor 313 causes the ball screw 314 to rotate in the forward direction (step S7), the base 306 moves along the guide rails 305 to the rear of the assembly stage 301. As a result, the jig 100 clamped by the base 306 is moved from the position D to the position E on the assembly stage 301. A linear scale 320 is fixed to the base 306 while a scale measuring portion 321 is fixed to the assembly stage 301. The scale measuring portion 321 measures the displacement of the linear scale 320 while sending the result of measurement to the control and operation unit 700. In response, the control and operation unit 700 selectively turns on or turns off the motor 313 and thereby controls the displacement of the base 308 with utmost accurately.

Whether or not the base 306 has reached the assembling position E is determined (step S8). If the answer of the step S8 is positive (Y), the motor 313 is turned off (step S9). As a result, the jig 100 carried on the base 306 is accurately brought to a stop at the position E. When the heads 2, head support 3 and intermediate members 4 set on the jig 100 each faces a particular assembly start position, a motor ZM included in the position adjusting mechanism 502 and assigned to the Z axis is turned on (step S10).

As shown in FIG. 9, the motor ZM causes a Z axis base 510 to move up and down along the Z axis perpendicular to the base 306. The motor ZM is fixed to a Y axis table 511. A motor YM assigned to the Y axis causes the Y axis table 511 to move in the X axis direction parallel to the direction of movement of the base 306 end the Y axis direction perpendicular to the Z axis direction. The motor YM is fixed to an X axis base 512 driven by a motor XM in the X axis direction.

The motor XM is fixed to a Z axis rotation base 513. A motor ZRM causes the table 513 to rotate in the $\gamma$ direction about the Z axis. A motor XRM is mounted on the Z axis base 510 for causing an X axis rotation base 514 to rotate in the $\alpha$ direction about the X axis. Further, a motor YRM is mounted on the X axis base 514 and causes a Y axis rotation base 515 to rotate in the $\beta$ direction about the Y axis.

An arm support 503 and two cylinders 504 and 505 playing the role of the clamping means 501 are mounted on the Y axis rotation table 514. The cylinders 504 and 505 are implemented by air cylinders. As shown in FIG. 9, arms 507 and 508 stand upright on the tops of the cylinders 504 and 505, respectively. The air cylinders 504 and 505 respectively move the arms 507 and 506 back and forth in the Y axis direction perpendicular to the direction of movement of the base 306. An arm 506 extends upward from the arm support 503 and faces the arms 507 and 508.

When the motor ZM assigned to the Z axis is turned on (step S10), it raises the Z axis base 510. Whether or not the arms 505, 607 and 508 of the clamping mans 501 have risen to a preselected clamping position is determined (step S11). If the answer of the step S11 is Y, the motor ZM is turned off in order to stop the elevation of the table 510 (step S12). As shown in FIGS. 9 and 10A, at the above clamping position, clamp pins 506a, 507a and 508a studded on the arms 506, 507 and 508 face to face, respectively, face holes 2f formed in opposite ends of the base 2c of the head 2 supported by the head support member 115.

After the Z motor ZM has been turned off, the motor YM assigned to the Y axis is turned on (step S13). As shown in FIG. 10A, the motor YM moves the arm 506 toward the base portion 2e of the head 2. As shown in FIG. 10B, clamp pin 506a of the arm 506 mates with the hole 2f of the base portion 2e (step S14). Then, the motor YM is turned off (step 15). Subsequently, the cylinders 504 and 505 are turned on (step S16). As shown in FIG. 10B, the cylinders 504 and 505 respectively move the arms 507 and 508 toward the base portion 2e. Consequently, as shown in FIG. 10C, the clamp pins 507a and 508a of the arms 507 and 508 mate with the other holes 2f of the head base 2e.

After the clamp pins 507a and 508b have clamped the base portion 2e of the head 2 in cooperation with the clamp pin 506a, the motor ZM assigned to the axis Z is again turned on (step S17). At this time, the motor ZM raises the Z axis base 510 and therefore the arms 506–508 to a preselected head mounting position (see FIG. 3). When the arms 506–508 reach the head mounting position, as determined in a step S18, the motor ZM is turned off in order to stop the elevation of the Z axis base 510 (step S19).

Thereafter, the nozzle position measuring means 602 is turned on (step S20, FIG. 6). The measuring means 602 measures the positions of preselected ones of the nozzle holes 2b of the head 2 in the X, Y and Z are directions. This is successful to determine whether or not the head surface 2d raised by the clamping means 501 is accurately located at the assembly position relative to the head support 3 positioned on the jig 100.

Conventional nozzle position measuring means picks up a single nozzle hole 2b formed in the surface 2d with a CCD camera including a solid imaging device. An operating section calculates the position of the center of gravity of the resulting image and there by determines the positions of the head 2 in the X and Y axis directions. Further, tho position of the head 2 in the Z axis direction is determined on the basis of defocus data output from an autofocus device built in the camera.

The above conventional scheme is disadvantageous for the following reasons. When the camera is focused on a single nozzle hole 2b in order to position the head 2, the positions of the single nozzle hole 2b in the X, Y and X axis directions can be accurately positioned. However, it is impracticable to accurately measure, based on the positions of the above nozzle hole 2b, the positional deviation of the other nozzle holes 2b ascribable to the irregularity and rotation of the surface 2d.

With the conventional scheme therefore, it is extremely difficult to correct the positional deviation of the other nozzle holes 2b ascribable to the above causes. That is, a long period of time and complicated calculations are necessary for the head 2 to be positioned.

In the illustrative embodiment, the head 2 is held by the clamping means 501 and position adjusting mechanism 502 in such a manner as to be adjustable in position relative to the head support 3. In this condition, the position of the head 2 is varied in order to detect three preselected points of the head 2 by using CCD cameras, so that the head 2 can be adjusted relative to the head support 3. In the illustrative embodiment, at least three CCD cameras assigned to the above three points have their optical axes inclined relative to the surface of the head 2 to be detected, i.e., the head surface 2d.

Specifically as shown in FIGS. 3 and 11, the measuring means 602 of the illustrative embodiment includes CCD cameras 601a–601e. The camera 601a detects the position of, e.g., the leftmost nozzle hole 2b-1 of the front array, as viewed in FIG. 11, in the inclined direction. The camera 601b detects the position of the nozzle hole 2b-1 in the vertical direction, A halogen light guide 603a guides halogen light output from the light source 504 to the nozzle hole 2b-1. The camera 601c detects the position of the rightmost nozzle hole 2b-2 of the front array, as viewed in FIG. 11, in the inclined direction. The camera 601d detects the position of the nozzle hole 2b-2 in the vertical direction. A halogen light guide 603b guides the halogen light to the nozzle hole 2b-2. The camera 601e detects the position of the center nozzle hole 2b-3 of the rear array, as viewed in FIG. 11, in the inclined direction. A halogen light guide 603b guides the halogen light to the nozzle hole 2b-3 via a mirror 606c.

As shown in FIG. 3, a top plate 331 is connected to the assembly stage 301 by a plurality of posts 330. A support plate 610 is mounted on the top plate 331 and extends downward through an opening 331a formed in substantially the center of the top plate 331. The measuring means 602 is mounted on the support plate 610.

With the three CCD cameras 601-a through 601c, it is possible to detect the nozzles 2b-1 through 2b-3 or three preselected points of the head surface 2d and determine their positions on the X, Y and Z coordinates. It is therefore not necessary to use the autofocus device customarily assigned to the Z axis direction.

In the illustrative embodiment, the measuring means 602 detects the nozzle holes 2b formed in the surface 2d of the head. As for the surface of a part lacking such portions to be detected, e.g., a solid imaging device, marks to be detected may be provided on the surface beforehand.

Assume that at least three CCD cameras have their optical axes positioned vertically to the head surface 2d for detecting the above three points. Then, because the optical axes of the camera are parallel to each other, the distance between the optical axes is unconditionally determined by the outside diameter of the cameras. Therefore, when the head 2 is relatively small and has the maximum distance between its three points smaller than the minimum distance between the optical axes of the cameras, the optical axes are positioned outside of the three points of the head 2. In this condition, the cameras cannot detect the three points of the head 2.

By contrast, in the illustrative embodiment, the optical axes of at least three CCD cameras 601 a through 601c are inclined relative to the surface 2 of the head 2 and can therefore be oriented in desired directions. This successfully prevents the minimum distance between three points that can be detected from being unconditionally determined by the outside diameter of the cameras. That is, it is possible to detect desired three points of the head 2 and accurately position the head 2 without regard to the size of the head 2.

Image data representative of the nozzle holes 2b- through 2b-3 and output from the cameras 601a through 601e are monitored on the CRT (Cathode Ray Tube) of the subcontroller or personal computer via the control and operation unit 700. Assume that the positions and shapes of the images being monitored are different from positions and shapes set beforehand. Then, it is determined that the head surface 2d does not accurately face the head mounting position (step S21, FIG. 6). As a result, the position adjusting mechanism 502 FIG. 9, is turned on (step S22). Specifically, the motors of the mechanism 502 are driven to shift the head 2 in the six directions X, Y, Z, α, β and γ. When the surface 2d accurately faces the head mounting position (Y, step S21) the measuring means 802 and adjusting mechanism 502 are turned off (step S23).

The head 2 is positioned at the head mounting position relative to the head support 3 by the above procedure. Subsequently, the position adjusting mechanism 402 included in the intermediate member mounting unit 400 is turned on (step S24) in order to drive the holding mechanism 401. As shown in FIGS. 3 and 12, the holding mechanism 401 includes two air chucks 405 and 406 capable of simultaneously chucking four intermediate members 4 necessary for adhering a single head 2 to the head support 3.

As shown in FIG. 3, the air chucks 405 and 406 are fixed to the end portion of a chuck arm 407. When the air chucks 405 and 406 are held in a home position, they are positioned right above the two grooves 116a, FIG. 4, of the intermediate member support member 116 set on the jig 100. As shown in FIG. 12, the air chucks 405 and 406 each has a rectangular lower end or chucking portion. With this configuration, each of the air chucks 405 and 406 can hold two intermediate members 4 located between two positioning pins 116b studded in the associated groove 116a, while maintaining the members 4 substantially in their set positions. Passageways 405a and 406a are respectively formed in the air chucks 405 and 406 in order to selectively suck or blow air via the bottoms and opposite sides of their chucking portions.

A shaft 407a is fixed to the base end of the chuck arm 407 and extends along the Y axis. The shaft 407a is supported by a chuck bracket 408 in such a manner as to be rotatable by substantially 180 degrees. A cylinder 409 implemented as an air cylinder supports the check bracket 408 such that the bracket 408 is movable up and down along the Z axis. As shown in FIG. 3, a robot 411 is mounted on a plate 410 fixed to the rear side of the assembly stage 301. The robot 411 moves the above cylinder 409 back and forth along the Y axis. A cylinder 412 also implemented by an air cylinder is fixed to the chuck bracket 408 and causes the shaft 407a to rotate.

When the position adjusting mechanism 402 is turned on (step S24), the cylinder 409 lowers the chuck bracket 408 along the Z axis. As a result, the chucking portions of the air chucks 405 and 406 are lowered to a position where each of them can chuck two of the intermediate members 4 set on the support member 116, as indicated by an arrow a in FIG. 12. The lowered position of the air chucks 405 and 406 is determined by a lower stop 409a fixed to the lower portion of the cylinder 409; a positioning piece 408a provided an the bracket 408 abuts against the lower stop 409a.

Subsequently, air is sucked via the passageways 405a and 406a, producing vacuum around the chucking portions of the air chucks 405 and 406. As a result, the air chucks 405 and 406 retain two intermediate members 4 each.

After the air chucks 405 and 406 have chucked the intermediate members 4, the cylinder 409 operates in the reverse direction in order to lift the chuck bracket 408 to a preselected level. Then, the cylinder 412 causes the shaft 407a to rotate by substantially 180 degrees, as indicated by an arrow b in FIG. 12. The cylinder 409 operating in the reverse direction lifts the chuck bracket 408 until the positioning piece 408a of the bracket 408 abuts against an upper stop 409b fixed to the upper portion of the cylinder 409, as indicated by an arrow c in FIG. 12. Consequently, the intermediate members 4 retained by the air chucks 405 and 406 are turned upside down and cause their surfaces 4a and 4b to face the tops and both sides on the chucking portions of the air chucks 405 and 406.

The adhesive applying means 403 includes a pair of syringes 431 positioned above the air chuck 405 and each having a pair of nozzles 430 for applying the UV curable adhesive to the surfaces 4a and 4b of each intermediate member 4. A heater 432 playing the role of the adhesive adjusting means 404 surrounds the respective syringe 431. The heater, 432 each maintains the UV adhesive at a preselected temperature (about 30° C.) providing the adhesive with optimal viscosity.

As shown in FIG. 3, each syringe 431 is fixed to a bracket 436 via a syringe holder 435. The bracket 436 is supported by a bracket holder 437 mounted on the underside of the top plate 331 and is slidable in the Y axis direction. The operator can therefore pull out the syringes 431 to the left of the device body, FIG. 3, by holding a lever 438 fixed to the bracket 406. This facilitates the replenishment of the UV curable adhesive to each syringe 431 and prevents the operator from touching the heater 432.

After the intermediate members 4 retained by the air chucks 405 and 406 have been turned upside down, as stated above, the nozzles 430 of the syringes 431 are caused to face the surfaces 4a and 4b of the two intermediate members 4 held by the air chuck 405, as shown in FIG. 12.

Subsequently, the adhesive applying means 403 is turned an (step S25. Specifically, the UV curable adhesive is applied to the surfaces 4a and 4b of the two intermediate members 4 held by the air chuck 405 via the two nozzles 430 of the two syringes 431. After the application of the adhesive to the surfaces 4a and 4b of the above two intermediate members 4, the robot 411 shifts the other air chuck 406 positioned at the left, as viewed in FIG. 3, rightward to the position where the air chuck 405 has been positioned. As a result, the surfaces 4a and 4b of the two intermediate members retained on the top and both sides of the holding portion of the air chuck 406 by suction face the two nozzles 430 of the two syringes 431. Then, the adhesive applying means 403 is again turned on in order to apply the adhesive to the surfaces 4a and 4b via the nozzles 430 of the syringes 431.

After the application of the adhesive to the four intermediate members 4 held by the air chucks 405 and 406, the air chucks 405 and 406 are returned to the previously mentioned home positions. At the same time, the robot 411 moves the air chucks 405 and 406 to preselected positions above the assembling position between the head 2 held at the mounting position and the head support 3. Subsequently, the cylinder 409 is turned on to lower the air chucks 405 and 406. Consequently, as shown in FIG. 13A, the four intermediate members 4 hold by the air chucks 405 and 406 face the mounting position between the head 2 end the head support 3.

In the above condition, air is jetted via the passageways 405a and 406a of the air chucks 405 and 406. As a result, the surfaces 4a and 4b of the four intermediate members 4 are released from the air chucks 405 and 406 and brought into close contact with the expected portions of the head 2 and head support 3. Thereafter, the air chucks 405 and 406 are returned to their home positions, and then the position adjusting mechanism 402 is turned off (step S26).

After the step S26, the head fixing unit 600 is turned on (step S27). Specifically, as shown in FIG. 14, the two UV light guides 605 retracted from the Y axis passage assigned to the air chucks 405 and 406 are moved to a position above the head 2 by a cylinder or air cylinder 620. In this condition, the UV light source 606 is turned on to issue UV rays toward the adhesive present on the surfaces 4a and 4b of the intermediate members 4 via the intermediate members 4. The adhesive is cured by the UV rays and fix the head 2 and head support 3 to each other via the intermediate members 4.

An air tube 621 is positioned above each of the UV light guide 605 and joined with the light guide 605 by a respective tie member 622. Air, preferably cool air, is blown out of such air tubes 621 toward the intermediate members 4 at the time of emission of the UV rays. This air protects the intermediate members 4 from thermal deformation ascribable to the UV rays and obviates the displacement of the head 2 and head support 3 ascribable to thermal stress.

After the head 2 has been fixed to the head support 3 by the above procedure, whether or not another head 2 should be fixed to the head support 3 is determined (step S28). Assume that the apparatus is so programmed as to sequentially fix the other heads 2 to the head support 3. Then, a head assembly routine for executing the above sequence of assembling steps is repeatedly executed until all the predetermined number of heads 2 have been fixed to the head support 3 (step S29). At this time, the data derived from the position adjustment of the preceding head 2 relative to the head support 3 are referenced as position adjustment data when the following head 2 is fixed to the head support 3. When all the preselected number of heads 2 are fully fixed to the head support 3 (N, step S28) the various units start returning to their home positions (step S30).

At the beginning of the step S30, the measuring means 602 is again turned on (step S31) to measure the positions of the three particular nozzle holes of each head 2. The result of this measurement shows whether or not the heads 2 are dislocated during assembly. Specifically, the control and operation unit 700 compares the data output from the measuring means 602 before and after the assembly and sends the result of decision on the configuration of the heads 2 to the CRT (step S32). The program ends when the various units are returned to their home positions (Y, step S33).

The illustrative embodiment has two setting positions A and B on the set stage 201, as stated with reference to FIG. 3. The paths between the setting positions A and B and the assembling position E along which the conveying unit 200 conveys the jigs 100 can be switched by the control and computation unit 700. Therefore, it is possible to convey one jig 100 conveyed from one setting position A to the assembling position E and completed assembly at the position E to the other setting position B. It is also possible to feet one jig 100 from one setting position A to the assembly position E end set, while the above jig 100 has its parts assembled, the structural parts of another head unit on the other jig 100 located at the other setting position B. The illustrative embodiment therefore reduces the operator's waiting time at the time of setting of the structural parts on the jig 100 and thereby enhances efficient assembly.

Curing the adhesive with UV rays via the intermediate member 4, as stated earlier, brings about the following problems, as determined by a series of experiments. The UV rays cause the composition of the transparent intermediate members 4 to change and cause the members 4 to color in muddy yellow little by little. Because the UV transmission of such colored intermediate members 4 decreases, the UV rays cannot fully cure the adhesive unless radiated for more than the expected period of time via the intermediate members. The decrease in the curing efficiency of the adhesive and therefore the extended radiation of the UV rays heats the intermediate members 4 to such a degree that the members 4 deform.

In order to solve the above problem, as shown in FIG. 15, the illustrative embodiment additionally includes a bandpass filter 630 positioned on the optical path of each UV light guide 605. The bandpass filter 630 cuts UV rays lying in the wave length range which would cause the property of the intermediate members 4 to change. It was experimentally found that the bandpass filter 630 successfully prevented the intermediate members 4 from coloring when cutting UV rays lying in a short wavelength range below about 300 nm. Preferably, the bandpass filter 630 should also cut UV rays lying in a long wavelength range heating the intermediate members 4 to an excessive degree.

Further, as shown in FIG. 5, the bandpass filter 630 is not located at the light source side where the UV rays generate a great amount of heat, but located on the output optical path of the UV light guide 605 and held by a filter mount 631. This reduces the thermal stress of the filter 630 itself during the radiation of the UV rays toward the adhesive.

During UV radiation, air is sent from the air tube 621 to the intermediate member 4 in order to cool off the member 4. This prevents the intermediate member 4 from being excessively heated during UV radiation and thereby obviates the fall of assembling accuracy ascribable to the thermal deformation of the member 4.

In the above embodiment, the adhesive is applied to the first and second surfaces (interfaces hereinafter) 4a and 4b of each intermediate member 4 intervening between the head 2 and the head support 3. In this case, the adhesive is not always applied to each of the interfaces 4a and 4b to a preselected thickness over a preselected area although it may be fed in a preselected amount. Specifically, adhesive used to mount the head 2 or similar part usually has relatively high viscosity so as not to drop and is apt to protrude in the form of yolk when applied to the surface of the part due to the surface tension of the adhesive.

Assume that the structural members are assembled by the adhesive protruding from the surfaces of the members, as stated above. Then, it is likely that the area of the adhesive on each structural member is smaller than the expected adhering surface and causes the members to come off due to short adhesion strength. In addition, when the thickness of the adhesive differs from the first interface 4a to the second interface 4b, the structural members are displaced from each other when assembled. Moreover, the protuberance of the adhesive just after application is not constant, rendering the stress inside of the adhesive irregular during curing. Therefore, should the structural members be assembled without any processing following the application of the adhesive, the head 2 would be inclined relative to the head support 3. In addition, it needs a long period of time for the adhesive protruding from the adhering surfaces to be cured, resulting in low productivity.

An alternative embodiment of the present invention will be described hereinafter which is capable of obviating short adhesion strength and positional deviation of the head 2 or similar part, head support 3 or similar part support, and intermediate members 4, and enhancing productivity during assembly. Let the head 2 and head support 3 be referred to as a part 2 and a part support 3, respectively.

FIGS. 16A–16C show a condition wherein the part 2, part support 3 and intermediate member 4 are assembled in a preselected position free from positional errors. As shown, in the accurate condition, cured adhesive P has a preselected thickness t1 between the part 2 and the intermediate member 4 and has a preselected thickness t2 between the part support 3 and the intermediate member 4. Also the adhesive P occupies a preselected area of L1×L2 between the part 2 and the intermediate member 4 and occupies a preselected area of L3×L4 between the part support 3 and the intermediate member 4. FIGS. 17A and 17B show a specific condition wherein the part 2 and part support 3 and the intermediate member 4 assembled together are dislocated relative to each other. As shown, the adhesive fails to have the above correct dimensions t1, t2, L1×L2 and L3×L4.

Briefly, in the illustrative embodiment, pressing means presses the intermediate member 4 against the part 2 and part support 3 so as to spread the adhesive P applied to the first and second interfaces 4a and 4b of the intermediate member 4. This successfully allows the part 2 and part support 3 and the intermediate member 4 to be accurately assembled in a preselected position free from positional deviation. That is, the pressing member increases the area which the adhesive P occupies on each of the interfaces 4a end 4b and thereby increases the adhesion strength. In addition, the pressing member substantially uniforms the thickness and configuration of the adhesive P.

Specific examples of this embodiment are as follows.

EXAMPLE 1

As shown in FIG. 18, the pressing means for pressing the intermediate member 4 against the part 2 and part support 3 is implemented by a single pin 10. The pin 10 is movable toward and away from the intermediate member 4 at such an angle that it exerts substantially the same components of a force on the first and second interfaces 4a and 4b. As a result, the adhesive P applied to the interfaces 4a and 4b is spread between the part 2 and part support 3 and the intermediate member 4, as illustrated. Consequently, the area of the adhesive on each of the interfaces 4a and 4b increases, increasing the adhesion strength between the associated structural elements. In addition, the thickness and configuration of the adhesive P are substantially uniformed.

EXAMPLE 2

As shown in FIGS. 19A and 19B, the pressing means is implemented by a first pin 11 and a second pin 12 movable toward and away from the intermediate member 4. The two pins 11 and 12 are respectively movable in the direction substantially perpendicular to the second interface 4b and the direction substantially perpendicular to the first interface 4a. That is, the pins 11 and 12 press the substantially vertical surface and substantially horizontal surface of the intermediate member 4 independently of each other. As a result, the adhesive P present on the interface 4a and the adhesive P present on the interface 4b can be spread independently of each other. It follows that even when the amount or the kind of the adhesive to be applied to one interface is changed, the structural elements can be evenly assembled without any positional deviation after the curing of the adhesive P.

EXAMPLE 3

As shown in FIG. 20, the pressing means is implemented by a single air nozzle 13. The air nozzle 13 blows air toward the intermediate member 4 at such an angle that it exerts substantially the same components of a force derived from air on the first and second interfaces 4a and 4b. Air sent from the air nozzle 13 presses the intermediate member 4 against the part 2 and part support 3 and thereby spreads the adhesive applied to the two interfaces 4a and 4b. Consequently, the area of the adhesive P on each of the interfaces 4a and 4b increases, increasing the adhesion strength between the associated structural elements. In addition, the thickness and configuration of the adhesive P are substantially uniformed.

Further, air pressing the intermediate member 4 simplifies arrangements around the position for adjusting the position of the individual structural element, compared to the mechanical pressing means. This facilitates the layout of the various holding means and position detecting means and frees the intermediate member 4 from marks ascribable to the mechanical pressing means.

EXAMPLE 4

As shown in FIGS. 21A and 21B, the pressing means is implemented by a first air nozzle 14 and a second air nozzle 15. The air nozzles 14 and 15 blow air toward the intermediate member 4 in the direction substantially perpendicular to the second interface 4b and the direction substantially perpendicular to the first interface 4a, respectively. The air nozzles 14 and 15 are capable of pressing the two surfaces 4b and 4a independently of each other and therefore spreading the adhesive P independently of each other without damaging the intermediate member 4. It follows that even when the amount or the kind of the adhesive to be applied to one surface is changed, the structural elements can be evenly assembled without any positional deviation after the curing of the adhesive P.

EXAMPLE 5

As shown in FIG. 22, the pressing means is implemented by a single air nozzle 16 formed with a first and a second air ejection port 16a and 16b, respectively. The air ejection ports 16a and 16b elect air in the direction substantially perpendicular to the first interface 4a and the direction substantially perpendicular to the second interface 4b. The air nozzle 16 blows air substantially evenly via the two ports 16a and 16b without resorting to delicate air adjustment, so that the two interfaces 4a and 4b can be pressed by the same force. This allows the adhesive P to be spread on both interfaces 4a and 4b under substantially the same condition. It follows that the same adhesion strength is achievable between the part 2 and the intermediate member 4 and between the part support 3 and the intermediate member 4. Therefore, even when a load acts on the part 2, the part 2 and adhesive P are prevented from being separated due to the concentration of a stress. If desired, an electromagnetic valve may be used to vary the amount and therefore the force of air to be sent from each of the port 16a and 16b.

EXAMPLE 6

FIG. 23A shows a plurality of (two in this example) first pins 17a and 17b while FIG. 24B shows a plurality of (two in this example) second pins 18a and 18b. The first pins 17a and 17b and second pins 18a and 18b constitute the pressing means for pressing the intermediate member against the part 2 and part support 3, Specifically, the pins 17a and 17b are movable back and forth in the direction substantially perpendicular to the first interface 4a of the intermediate member 4. The pins 18a and 18b are movable back and forth in the direction substantially perpendicular to the second interface 4b of the intermediate member 4. In this configuration, the pressures of the pins 17a and 17b to act on the surface 4a do not concentrate, but are scattered. This is also true with the pressures of the pins 18a and 18b to act on the surface 4a. This prevents the intermediate member 4 from tilting and further uniforms the thickness of the adhesive P on each of the interfaces 4a and 4b.

EXAMPLE 7

As shown in FIGS. 24A and 24B, Example 7 is similar to Example 4 (FIGS. 21A and 21B) except that air nozzles 14 and 5 have flared nozzle holes 14a and 15a, respectively. The flared nozzle holes 142 and 15a eject air onto substantially the entire first and second surfaces 4a and 4b, respectively. If desired, the flared air nozzle holes 14a and 15b each may be replaced with a plurality of nozzle holes. In this configuration, air from the air nozzle 14 and air from the air nozzle 15 are substantially evenly sent to the interfaces 4a and 4b, respectively. This prevents the intermediate member 4 from tilting and further uniforms the thickness of the adhesive P on each of the interfaces 4a and 4b.

The adhesive is not always applied to each of the surfaces 4a and 4b to a preselected thickness over a preselected area although it may fade in a preselected amount, as stated earlier. Specifically, the adhesive for adhering the part 2 and intermediate member 4 and the part support 3 and intermediate member 4 should preferably spread to a certain degree due to its own weight when applied to the surfaces 4a and 4b and thereby form layers of substantially uniform thickness. For this reason, such adhesive should preferably have relatively high fluidity, i.e., relatively low viscosity.

However, assume that the adhesive having high fidelity, or low viscosity, is applied to the substantially vertical first interface 4a and substantially horizontal second interface 4b in order to connect the part 2 and part support 3 via the intermediate member 4. Then, such liquid-like adhesive on the first interface 4a is apt to drop due to its own weight or to turn round to the second interface 4b. When the adhesive drops or turns round to any other position, the amount of the adhesive applied to the interface 4a and that of the adhesive applied to the interface 4b differ from the initial amount. As a result, the adhesive layers formed on the interfaces 4a and 4b are different in thickness from each other.

In the above condition, the positional relations between the part 2 and the intermediate member 4 and between the part support 3 and the intermediate member 4 are quite likely to differ from the time of position adjustment to the time of completion of the assembly. Errors in this kind of positional relations cannot be corrected by the position adjustment beforehand because the drop or the turn-round of the adhesive or an increase or a decrease in the amount of the adhesive ascribable thereto cannot be estimated. By contrast, errors ascribable to the contraction of the adhesive due to curing can be corrected by the position adjustment beforehand because the positional deviation of the individual member is proportional to the amount and area of application of the adhesive.

Another alternative embodiment of the present invention which is a solution to the above problem will be described with reference to FIG. 25. As shown, adhesive P1 applied to the first or substantially vertical interface 4a has higher viscosity, or lower fluidity, than adhesive P2 applied to the second or substantially horizontal interface 4b. The adhesive P1 applied to the interface 4a does drop or turn round to other portions.

Although the adhesive P2 applied to the interface 4b has comparatively high fluidity, or comparatively low viscosity, it does not drop or turn round to other portions because the interface 4b is substantially horizontal. In addition, as shown in FIG. 26, the adhesive P2 spreads due to its fluidity and can be automatically uniformed in thickness.

As shown in FIG. 27, the adhesive P1 applied to the vertical surface 4a should preferably have viscosity causing the adhesive P1 to spread downward due to gravity over an area A2 which is substantially double the area A1 of the adhesive P1 initially applied. This allows the adhesive P1 applied to the surface 4a to spread within a range not causing it to drop or turn round.

Further, as shown in FIG. 28, recesses 3a and 4c may be respectively formed in the lower portion of the part support 3 and the lower portion of the vertical surface 4a to which the adhesive P1 is applied. When the adhesive P1 applied to the surface 4a spreads downward due to its own weight, it is scattered into the recesses 3a and 4c and stopped thereby. As a result, the thickness of the adhesive P1 decreases to, in turn, increase the surface tension of the adhesive P1. The adhesive P1 is therefore prevented from spreading more than necessary, i.e., dropping.

As shown in FIG. 29, the illustrative embodiment effects, before the adjustment of the relative position of the part support 3 and part 2, half-curing of at least the adhesive P1 applied to the substantially vertical interface 4a so as to prevent it from dropping due to its own weight. The half-cured adhesive P1 does not drop or turn round to other portions.

Reference will be made to FIG. 30 for describing a specific procedure for half-curing both the UV adhesive P1 applied to the substantially vertical interface 4a and the UV adhesive P2 applied to the substantially horizontal interface 4b. The procedure begins when the step S27, FIG. 8, is executed after the surfaces 4a and 4b of the intermediate member 4 have been brought into close contact with the part 2 and part support 3 (step S26, FIG. 6).

As shown in FIG. 30, when the step S27 begins, the head fixing unit is turned on. In response, the head fixing unit causes the cylinder 620 to move the UV light guides 605 from the retracted position outside of the Y axis path of the air chucks 405 and 406 to the position above the head 2 (Step S27a), as stated earlier with reference to FIG. 14. In this condition, the UV light source 606 is turned on to issue UV rays (step S27b). The UV rays illuminate the adhesive P1 on the interface 4a and the adhesive P2 on the interface 4b via the UV light guides 605 and intermediate members 4 (step S27b). At this instant, the duration of the UV radiation is selected to be long enough to half-cure at least the adhesive P1 on the substantially vertical interface 4a to a degree preventing it from dropping due to its own weight (1 second in the illustrative embodiment). By the UV radiation, the adhesive P1 and adhesive P2 are half-cured, temporarily connecting the part 2 and part support 3 via the intermediate members 4.

On the elapse of the above period of time (Y, step S27c), the UV radiation of the UV light source 606 is interrupted (step S27d). In this condition, the position adjustment mechanism 502 is turned on in order to adjust the position of the part or head 2 relative to the part support 3 (step S27e). At this instant, the adhesive P1 and adhesive P2 half-cured on the interfaces 4a and 4b, respectively, do not drop or turn round to other portions. In addition, the displacement of the part 2 relative to the part support 3 is not obstructed at all.

On the completion of the position adjustment of the part 2 or head (Y, step 27f), the position adjusting mechanism 502 is turned off (step S27g). If the above position adjustment does not complete due to some error (N, step S27f), then an error message is displayed on the CRT.

When the position adjusting mechanism 502 is turned off, the UV light source 606 is again turned on to radiate UV rays. The UV rays again illuminates the adhesive on the intermediate members 4 via the UV light guides 605 and members 4 (step S27h). At this time, the duration of the UV radiation is selected to be long enough to fully cure the adhesive P1 and P2 (40 seconds in the illustrative embodiment). The adhesive P1 and P2 now fully cured firmly connect the part 2 and part support 3 via the intermediate members 4. On the elapse of the above period of time (Y, step S27i), the UV light source 606 is turned off (step S27j).

Subsequently, the UV light guides 605 are returned to their retracted positions (step S27k). This is followed by the step S28 shown in FIG. 6.

In the illustrative embodiment the part is adjusted in position relative to the part support 3 after the half-curing of the adhesive P1 and P2 respectively existing on the two interfaces 4a and 4b, as stated above. In this case, if the displacement of the part 2 relative to the part support 3 is relatively great, then the adhesive existing on the interface 4a or 4b perpendicular to the direction of displacement of the part 2 is apt to come off the part support 3. For example, when the part 2 shown in FIG. 29 is noticeably displaced in the direction indicated by an arrow a, the adhesive P1 present on the interface 4a perpendicular to the direction a is apt to come off the part support 3.

In light of the above, as shown in FIG. 31A specifically, the illustrative embodiment first half-cures the adhesive P1 applied to the first interface 4a and then adjusts the position of the part 2 in the horizontal direction (arrow a) relative to the part support 3. At this stage, the adhesive P2 on the second surface is not cured at all. Therefore, although the displacement of the part 2 relative to the part support 3 in the horizontal direction may be great, the half-cured adhesive P1 on the interface 4a perpendicular to the above direction exerts a greater adhesion force than the non-cured adhesive P2 on the interface 4b. This prevents the adhesive P1 from coming off the part support 3 despite the above movement of the part 2.

Assume that the part 2 held in the condition shown in FIG. 31A is simply lowered by the position adjustment. Then, because the adhesion force of the non-cured adhesive P2 on the interface 4b is smaller than that of the half-cured adhesive P1 on the interface 4a, the adhesive P2 is apt to come off the part 2 due to the above displacement of the part 2.

Figure 31B:
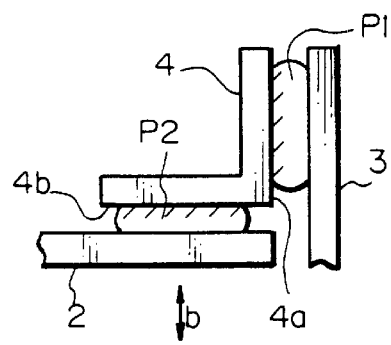

To solve the above problem, as shown in FIG. 31B, the illustrative embodiment half-cures the adhesive P2 on the interface 4b to a higher degree than the half-cured adhesive P1 and then moves the part 2 adjusted in the horizontal direction a in the vertical direction indicated by an arrow b. As a result, the half-cured adhesive on the interface 4b perpendicular to the direction of the downward movement of the part 2 achieves a greater adhesion force than the half-cured adhesive P1. The adhesive P2 is therefore prevented from coming off the part 2 despite the vertical movement of the part 2.

Figure 32B:
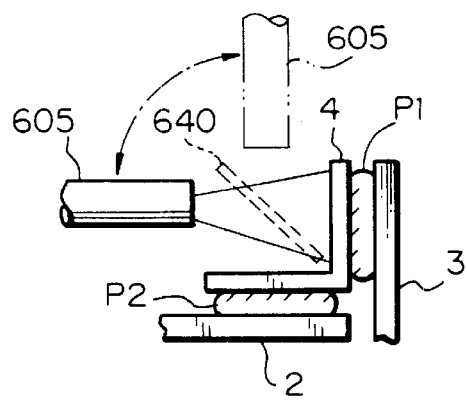

FIGS. 32A and 32B each shows a particular method for half-curing the adhesive P1 on the interface 4a and then half-curing the adhesive P2 on the interface 4b to a higher degree than the adhesive P1, as stated above. In FIG. 32A, the adhesive P1 on the interface 4a is half-cured via a first UV light guide 605, and then the adhesive P2 on the interface 4b is half-cured via a second UV light guide 605b to the above particular degree. In FIG. 32B, the adhesive P1 on the interface 4a is half-cured first. Subsequently, the UV light guide 605 is shifted to a position for illuminating the adhesive P2 on the interface 6b, as indicated by a dash-and-dot line, or a mirror 640 is inserted into the optical path of the light guide 605, as indicated by a dashed line. That is, the optical path of the light guide 605 is so switched as to illuminate the adhesive P2. In this condition, the adhesive P2 is half-cured to the above particular degree.

As shown in FIG. 33, recesses 3a and 4c may be respectively formed in the lower portion of the part support 3 and the lower portion of the substantially vertical interface 4a to which the adhesive P1 is applied. When the adhesive P1 applied to the interface 4a spreads downward due to its own weight, it is scattered into the recesses 3a and 4c and stopped thereby. As a result, the thickness of the adhesive P1 decreases to, in turn, increase the surface tension of the adhesive P1. The adhesive P1 is therefore prevented from spreading more then necessary, i.e., dropping.

In summary, it will be seen that the present invention provides a method and an apparatus for assembling parts having various unprecedented advantages, as enumerated below, (1) A part and a part support are connected together by use of photocuring adhesive with the intermediary of intermediate members formed of a material transparent for light. At this instant, a bandpass filter cuts light lying in a wavelength range causing the property of the intermediate members to change. The intermediate members are therefore prevented from coloring or deforming despite the radiation of the light. Further, the intermediate members are free from deformation ascribable to heat derived from the radiation. At the same time, the structural parts are free from a decrease in assembling accuracy ascribable to the deformation of the intermediate members.

(2) Pressing means presses the intermediate members against the part and part support. As a result, adhesive applied to a first and a second interface is spread between the first interface and the part and between the second interface and the part support. Therefore, the area occupied by the adhesive on each interface and therefore the adhesion strength increases. In addition, the thickness and configuration of the adhesive on each interface can be uniformed in order to enhance the accuracy of the individual structural part.

(3) The adhesive applied to the first or substantially vertical interface has higher viscosity than the adhesive applied to the second or substantially horizontal interface. The adhesive on the first interface is therefore prevented from dropping or turning round to other portions. It follows that the thickness of the adhesive for connecting the part and intermediate member and the part support and intermediate member is uniformed, further enhancing the accurate assembly of the part and part support.

(4) Before the relative position of the part and part support is adjusted, at least the adhesive applied to the first interface is half-cured so as not to drop due to its own weight. This is also successful to prevent the adhesive from dropping and therefore to further enhance the accurate assembly.

Various modifications will become possible for those skilled in the art after receiving the teachings of the present disclosure without departing from the scope thereof.

What is claimed is:

1. A method of fixing a part and a part support for mounting said part via an intermediate member using adhesive, said method comprising the steps of:

positioning the intermediate member between the part and the part support, thereby forming a first interface between the intermediate member and the part and a second interface between the intermediate member and the part support;

applying adhesive to the first interface and the second interface; and causing pressing means to press the intermediate member against the part and the part support, thereby causing the adhesive applied to said first interface and said second interface to spread, wherein said pressing means comprises an air nozzle for sending air toward the intermediate member in a direction angled such that substantially identical components of a force act on said first interface and said second interface.

2. A method as claimed in claim 1, wherein said air nozzle has nozzle holes for blowing air onto substantially entire areas of said first interface and said second interface.

3. A method of fixing a part and a part support for mounting said part via an intermediate member using adhesive, said method comprising the steps of:

positioning the intermediate member between the part and the part support, thereby forming a first interface between the intermediate member and the part and a second interface between the intermediate member and the part support;

applying adhesive to the first interface and the second interface; and causing pressing means to press the intermediate member against the part and the part support, thereby causing the adhesive applied to said first interface and said second interface to spread, wherein said pressing means comprises air nozzles for blowing air toward the intermediate member in a direction substantially perpendicular to said first interface and a direction substantially perpendicular to said second interface, respectively.

4. A method as claimed in claim 3, wherein said air nozzles have nozzle holes for blowing air onto substantially entire areas of said first interface and said second interface.

5. A method of fixing a part and a part support for mounting said part via an intermediate member using adhesive, said method comprising the steps of:

positioning the intermediate member between the part and the part support, thereby forming a first interface between the intermediate member and the part and a second interface between the intermediate member and the part support;

applying adhesive to the first interface and the second interface; and causing pressing means to press the intermediate member against the part and the part support, thereby causing the adhesive applied to said first interface and said second interface to spread, wherein said pressing means comprises an air nozzle including two nozzle holes for blowing air toward the intermediate member in a direction substantially perpendicular to said first interface and a direction substantially perpendicular to said second interface, respectively.

6. A method as claimed in claim 5, wherein said nozzle holes blow air onto substantially entire areas of said first interface and said second interface, respectively.

* * * * *